June 23, 1959  W. L. SMITH  2,892,180
AIRCRAFT FLIGHT INSTRUMENT
Filed Nov. 17, 1951  5 Sheets—Sheet 1

INVENTOR:
Wesley L. Smith
BY
ATTORNEY

June 23, 1959 W. L. SMITH 2,892,180
AIRCRAFT FLIGHT INSTRUMENT
Filed Nov. 17, 1951 5 Sheets-Sheet 2
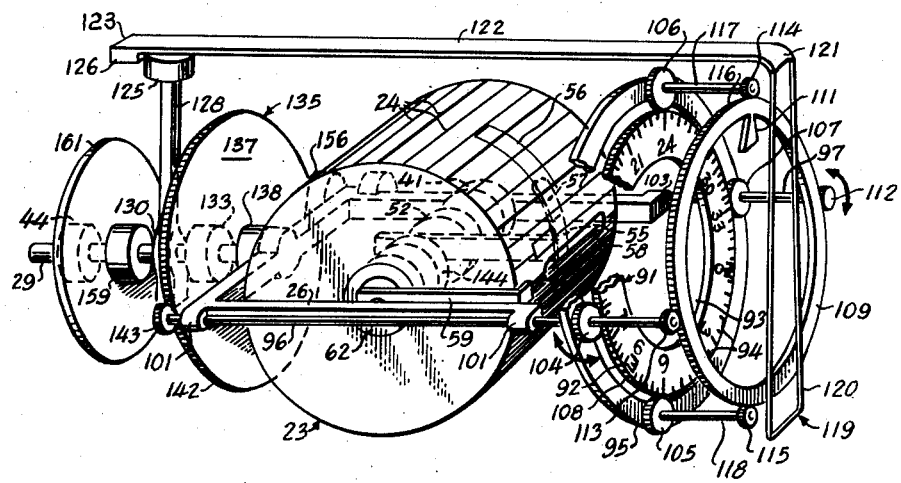
FIG. 5
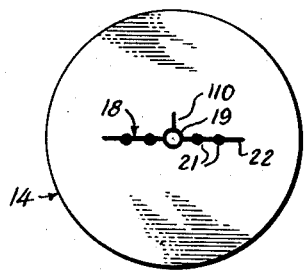
FIG. 6
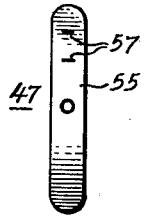
FIG. 7
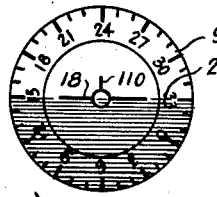
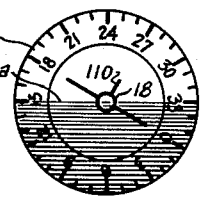
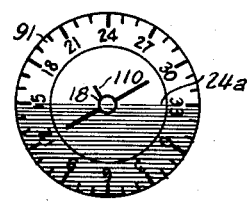
FIG. 9
INVENTOR:
Wesley L. Smith
BY Walter J. Jason
ATTORNEY

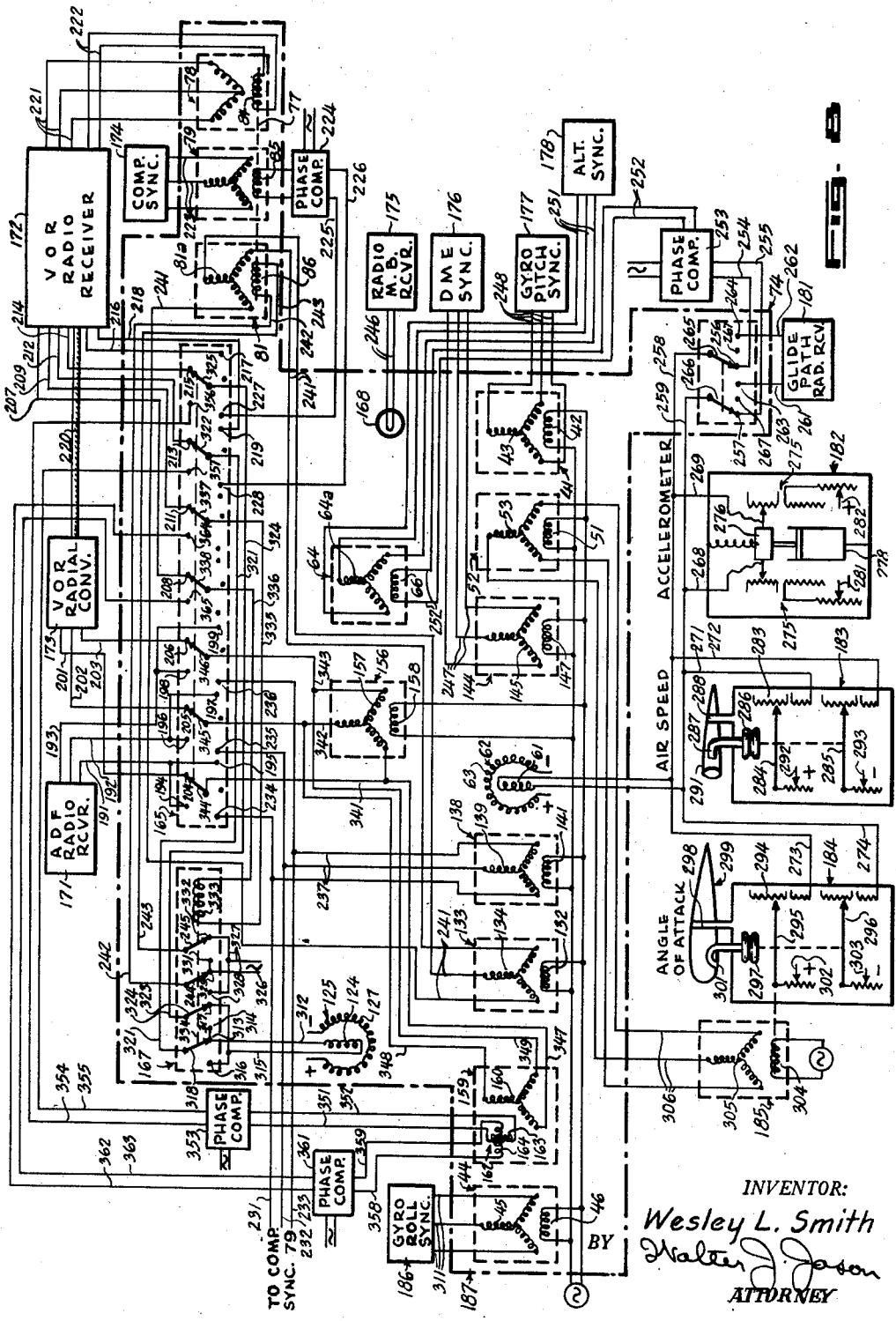

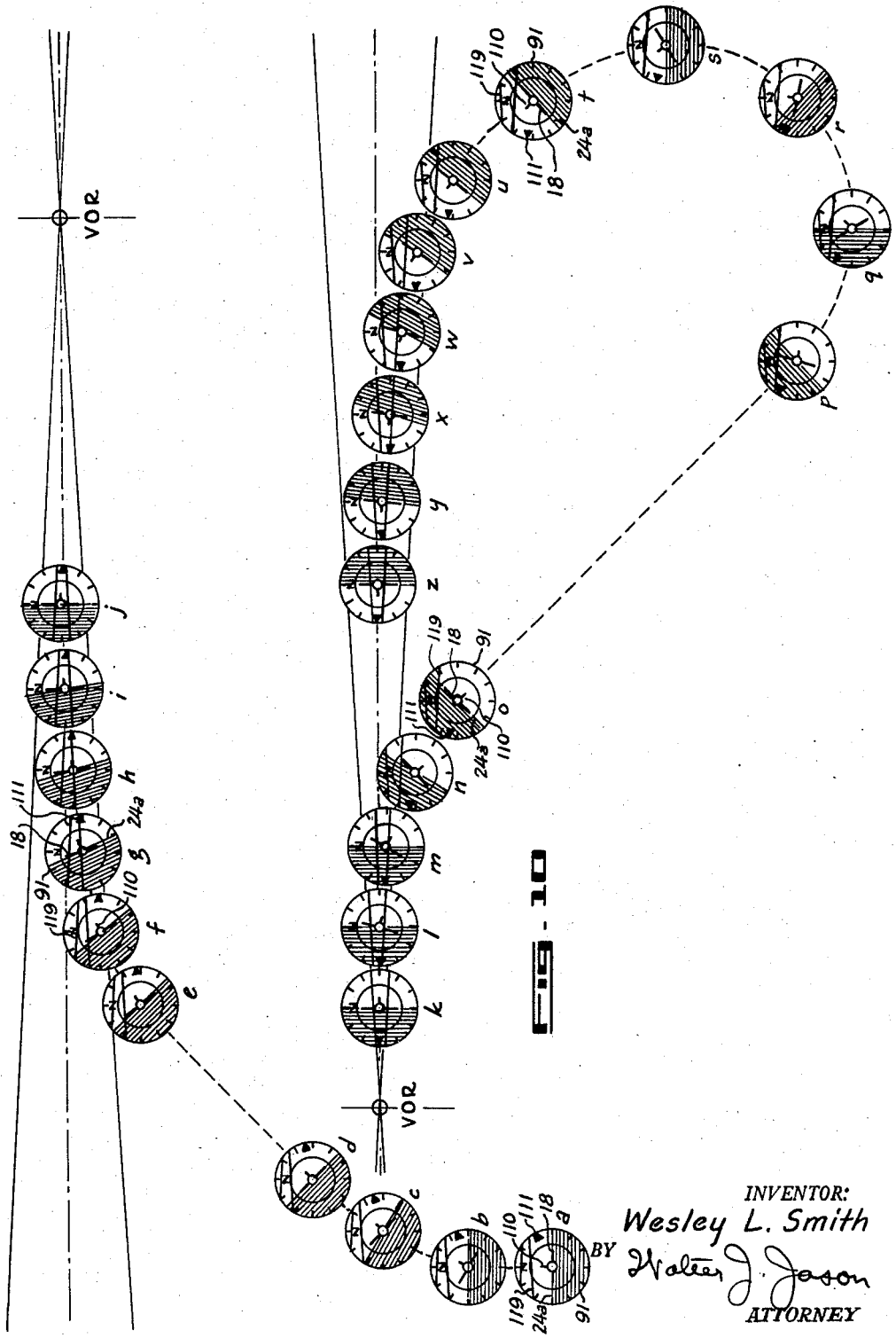

June 23, 1959 W. L. SMITH 2,892,180
AIRCRAFT FLIGHT INSTRUMENT
Filed Nov. 17, 1951 5 Sheets-Sheet 5
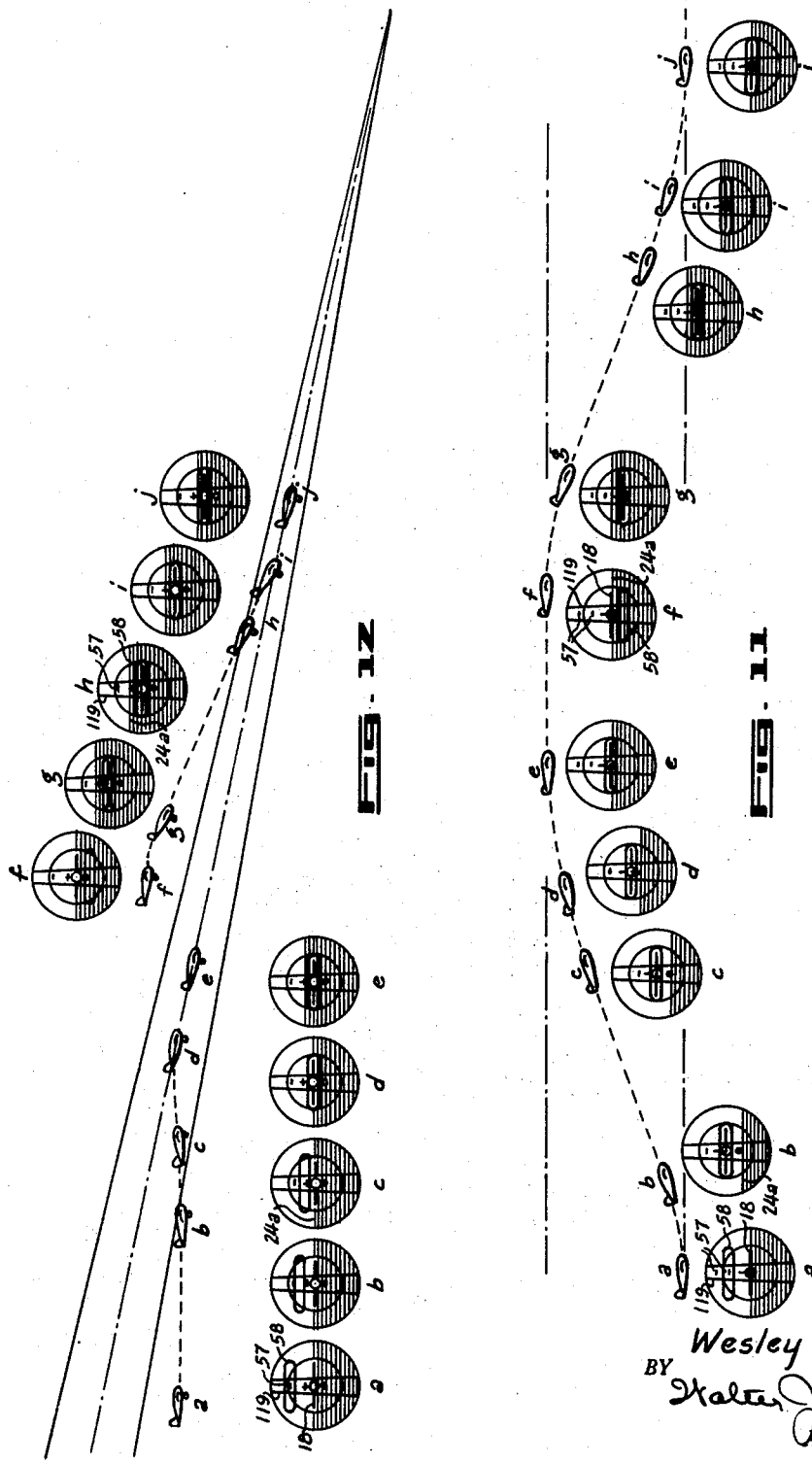
INVENTOR:
Wesley L. Smith
BY
ATTORNEY United States Patent Office 2,892,180
Patented June 23, 1959

2,892,180

AIRCRAFT FLIGHT INSTRUMENT

Wesley L. Smith, San Diego, Calif.

Application November 17, 1951, Serial No. 256,947

53 Claims. (Cl. 340—27)

This invention relates generally to aircraft instruments and more particularly to an aircraft flight indicator which responds to information received from a plurality of separated instruments and sources to afford indications to a pilot which will enable him to direct his airplane on a desired path.

The flight of an airplane in a particular path, whether the path be straight or curved is essentially determined by the attitude of the airplane. Variance from a given path is effected by changing the attitude. It is, therefore, the principal object of this invention to provide an instrument which will accept guidance signals from any of the available sources and will react or respond thereto to indicate an attitude, at each instant, for the airplane whereby the airplane may be guided by the pilot to any desired path asymptotically and thence along that path with minimum deviation therefrom and with minimum manipulation of the flight controls.

Another object of the invention resides in the provision of a novel aircraft flight indicator which affords at one location all such flight information as is required by a pilot to fly an airplane along a desired path with a minimum of deviation therefrom whether taking off, in normal flight, while following a directional radio beam, or while landing with the assistance of radio beams.

Another object of the invention is to provide an indicating instrument for aircraft which affords continuous and distinctive visual indication of such pertinent flying information as the airplane's current attitude with respect both to the air through which flight is being made and to the earth, and the desired attitude with respect to both for guidance, its heading, the bearing and magnetic bearing to a selected radio source, the relative azimuth and relative displacement from the airplane of a selected radio beam, and further affords indications of the direction and distance to the desired destination along that beam.

A further object of the invention resides in the provision of a flight instrument embodying reference elements with respect to which guidance signals from remote sources are read whereby the airplane may be maintained in a correct attitude and flight path, such reference elements being a miniature airplane, and annularly arranged markings on the periphery of the instrument dial representing azimuth and roll angles.

A further object is to provide a flight instrument of novel construction which permits a pilot to maintain an airplane on a prescribed path with a minimum of effort and which permits him to view diagrammatically on its face the manner in which the airplane executes the necessary maneuvers to attain an objective.

A still further object is to provide an improved flight instrument whereby a pilot may establish a track or beam through any radio transmitter of any nature on any selected heading.

A still further object is to provide a novel aircraft instrument which is adapted to measure and indicate the dynamic and aerodynamic forces acting upon the airplane with relation to an attitude indicator in a manner that continuously prescribes a safe attitude for the airplane in the guidance maneuvers.

Other objects and advantages of the invention will be readily apparent to those skilled in the art from the detailed description which follows and from the accompanying drawings illustrating the principles of the invention, and in which:

Figure 5 is a view, in perspective, of the flight instrument illustrating various of the elements in spaced relation, with exaggeration of certain of the shafts as to length, and all for the purpose of clarity of illustration of the essential movable elements.

Figure 6 is a view of a detail.

Figure 7 is a view of a detail.

Figure 8 is a wiring diagram of a flight control system for this flight instrument illustrating the principles of the present invention; and Figures 9, 10, 11 and 12 are schematic representations of the face of the instrument dial illustrating varying flight maneuvers using the principles of the invention.

Figure 1:
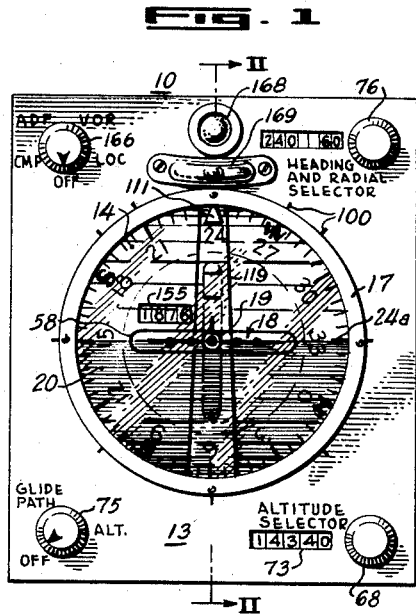
Figure 1 is a front elevational view of a flight instrument illustrating the principles of the present invention.
Figure 2:
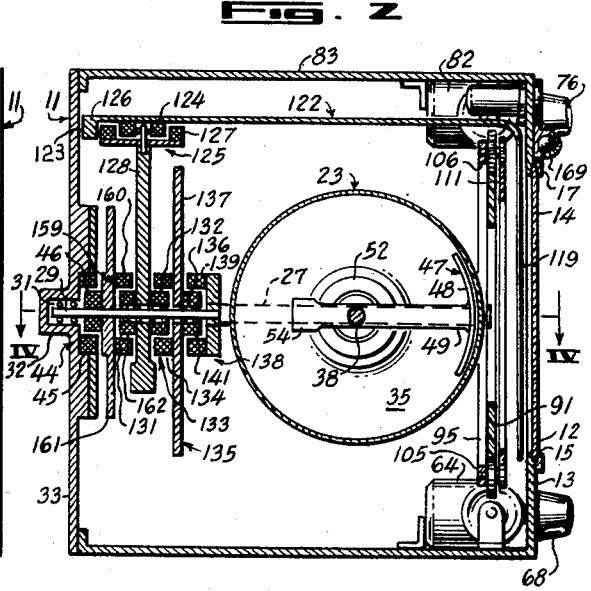
Figure 2 is a sectional view taken on the line II—II of Figure 1.
Figure 3:
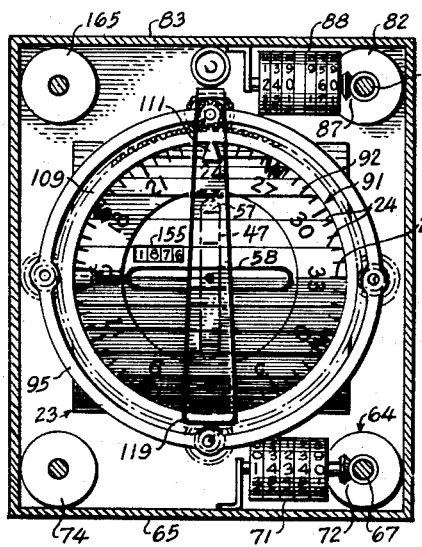
Figure 3 is an elevational view similar to that of Figure 1 but with the front face of the housing cut away.

Having reference with greater particularity now to the drawings, Figures 1 to 7 illustrate one form of flight indicator instrument construction showing the principles of the present invention. The flight indicator instrument as a unit will be designated in the drawings generally by the numeral 10.

As shown, flight indicator 10 comprises a generally rectangular metallic enclosing housing 11, with a circular aperture 12 provided in its front wall 13. A window 14 formed of a suitable material, which may be a transparent plastic such as polymethyl methacrylate readily commercially available under the trade-names "Lucite" and "Plexiglas," is fitted at the circular opening 12 against an annular ledge 15 in surrounding relationship to the aperture 12. A mounting ring 17, secured by suitable fasteners such as screws, maintains window 14 in place. In the present instrument a reference line is formed in the face of window 14 as a miniature airplane generally indicated by the numeral 18. Miniature airplane 18, as shown in Figure 6, is formed of a small black circle 19, located at the center of window 14, which represents the fuselage of the airplane, and two black dots 21 on each side thereof which may represent engines, all interconnected by a black line 22, to provide a representation of airplane wings. The instrument 10 will be mounted within an airplane in a manner as to position this black line 22 parallel to the transverse or pitch axis of the airplane.

A hollow cylinder 23, which similarly to window 14 may be formed of a suitable transparent plastic material such as polymethyl methacrylate, is supported within housing 11 for rotative movement about both its longitudinal and transverse axes in a manner to be described. The surface of the cylinder 23 is suitably marked to provide a plurality of longitudinally extending lines 24 which, in this instrument, are maintained parallel to the earth's surface by means to be described. Cylinder 23 will be positioned within housing 11 sufficiently close to window 14 that the lines 24 on its surface can be easily viewed through the window 14. One line, numbered 24a, of the group of parallel lines 24, is made to align with black line 22 of miniature airplane 18 and bisect circle 19 when the aircraft is in straight and level flight and, as shown, constitutes the artificial horizon line. This line is adapted to move above or below the reference line shown as a miniature airplane 18 as the airplane pitches, or to pivot about the circle 19 of the miniature airplane 18 as a center on roll of the airplane. The manner in which these movements of line 24a is accomplished will be hereinafter described.

The plastic material comprising the cylinder 23 is tinted both above and below line 24a but with the lower portion of the exterior surface of cylinder 23, tinted, as generally shown at 20, a darker color in the area below the artificial horizon line 24a to better distinguish the position of the natural horizon which line 24a simulates. The various parallel lines 24 provided on the surface of cylinder 23 are annularly spaced therearound at 10° intervals for convenience of the pilot. For his further convenience, every third parallel line may, if desired, be made heavier and darker to permit easier reading of the pitch and roll angles with relation to the miniature airplane 18 and to the angle marks 100 on the instrument casing around the periphery of the window.

Figure 4:
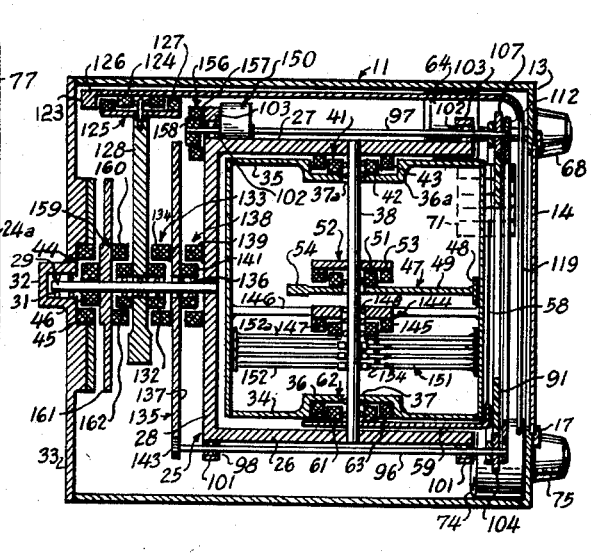
Figure 4 is a sectional view taken along the line IV—IV of Figure 2 but with the beam indicator and its supporting arm rotated 90° from its position in Figure 2.

The supporting structure for cylinder 23, as best shown in Figure 4, embodies a generally U-shape gimbal frame 25 having spaced arms 26 and 27 and a bight portion 28. A shaft 29 mounts the gimbal frame 25 for rotative movement, with one end of shaft 29 being secured, as by a press fit to bight portion 28 and the other end rotatably supported by a bearing 31 operatively secured within a hub 32 formed in rear wall 33 of housing 11. Mounting plates or caps 34 and 35 are affixed to cylinder 23 at each end thereof and each has an inwardly projecting hub portion numbered respectively 36 and 36a, with hub portion 36 housing a bearing 37 and hub portion 36a accommodating a bearing 37a. A through shaft 38 extends through the spaced bearings 37 and 37a and has its ends fixedly supported in arms 26 and 27 of gimbal frame 25 to effect a rotatable support for the cylinder 23.

For effecting rotative movement of cylinder 23 about shaft 38 in response to pitch movements of the airplane, there is provided a synchro 41 which is shown to be of the Selsyn type well known in the art. The synchro 41 is located at the end of cylinder 23 carrying mounting plate 35 and has its rotor 42 fixed to hub 36a of this plate 35 and its stator 43 fixed to gimbal arm 27. Rotor 42 of synchro 41 rotates to effect movement of cylinder 23 about its longitudinal axis in response to signals received from a source to be later described which source reacts to pitch conditions.

Rotative movement of the cylinder 23 about its transverse axis in response to rolling actions of the airplane is controlled by a synchro 44, which similarly to synchro 41, is of the Selsyn type. Synchro 44 has its stator 45 mounted upon rear wall 33 of housing 11 and its rotor 46 secured to shaft 29. Synchro 44 is adapted, in response to roll signals transmitted thereto, to effect rotation of shaft 29 and of the gimbal frame 25 secured thereto, and thereby rotate cylinder 23 about a transverse axis, since cylinder 23, as has been described, is carried by the arms 26 and 27 of the gimbal frame 25.

An angle of attack indicator 47 is associated with cylinder 23 and comprises an arcuate member 48 carried at one end of a rotatable support arm 49. This support arm 49 is secured to a rotor 51 of a repeater synchro 52, whose stator 53 is carried by the through shaft 38 which supports cylinder 23. A counterbalance 54 is provided at the opposite end of support arm 49 and serves to properly position arcuate member 48 relative to miniature airplane 18. Arcuate member 48, its support arm 49, and its actuating synchro 52 are all located within hollow cylinder 23. The convex face 55 of arcuate member 48, however, is visible through an untinted portion 56 provided in the wall surface of cylinder 23 in the area adjacent window 14. This convex face 55 is marked at appropriate positions thereon for the purpose of providing the pilot with desirable pertinent information relating to angle-of-attack. These markings comprise the symbol zero, for indicating the zero angle of attack when this symbol lies within circle 19 of miniature airplane 18, and a plurality of lines 57 parallel to the axis 38 of cylinder 23 which is maintained horizontal. The purpose of such plurality of parallel lines 57 is to afford to the pilot indications as to the optimum lift-over-drift angle of attack, the optimum angle of attack for an approach to a landing, and the stalling angle of attack for the particular airplane utilizing instrument 10, each angle-of-attack being represented by a horizontal marking. The current angle-of-attack at which an airplane is flying will be signified by the particular horizontal marking which appears behind circle 19 of miniature airplane 18. Circle 19 is, therefore, the reference against which angles-of-attack are measured.

It is merely a matter of calibration to determine the locations at which the horizontal markings are to be placed on the convex face 55 of arcuate member 48 to permit them to serve as indicators of such angles-of-attack as have been discussed. The lines 57 could be of various colors to permit the pilot to readily distinguish between them, or, if desired, they could be accompanied by code letters or numbers in order that the pilot might readily grasp the significance of a particular marking 57.

A vertical guidance indicator 58 comprised of a wire formed into an ellipse which can bracket the miniature airplane 18 is affixed to the free end of a rotatable arm 59. Rotatable arm 59 has its opposite end secured to the rotor 61 of an actuator 62, which rotor 61 is suitably supported for rotative movement on shaft 38. Actuator 62 has its stator 63 secured to end cap 34 of cylinder 23 whereby stator 63 rotates in common with cylinder 23. Direct current from a suitable energy source (not shown) is provided stator 63 (through usual conducting leads, not shown), to effect an electromagnet of high strength which will develop the necessary torque to effect operation of the indicator. Electrical signals for controlling the operation of the rotor 61, and consequently for controlling the movement of indicator 58, may be afforded by any of the available vertical guidance sources such as those hereinafter described. The extent of movement of rotor 61 will be proportional to the strength of the signals received by it. Indicator 58 by its position above or below the artificial horizon line 24a affords an indication of the vertical position of a selected altitude or path relative to the airplane carrying instrument 10. Stator 63 of actuator 62 is so oriented with respect to cylinder 23 that vertical guidance indicator 58 controlled by it lies opposite artificial horizon line 24a when no signals are being directed to rotor 61.

An altitude selecting means is provided in instrument 10 adapted to direct control signals to rotor 61 of actuator 62 to move indicator 58 above or below artificial horizon line 24a in response to the vertical position of the conveying airplane relative to a selected altitude. These means embody a self-contained synchro 64 affixed to bottom wall 65 of housing 11. Synchro 64 has a sensing rotor 66 (as shown in Figure 8) suitably mechanically coupled through a shaft 67 to an altitude selector knob 68 operatively positioned on front wall 13 of housing 11. A usual mechanical counter 71 is supported within housing 11 adjacent synchro 64 and is connected through gearing 72 to shaft 67 whereby the counter 71 may be actuated in response to movements of the knob 68 and the sensing rotor 66 of synchro 64. An opening 73 is cut through front wall 13 to permit reading of the counter 71.

A conventional three-position, double-pole vertical guidance selector switch 74 is shown mounted within housing 11, supported on the bottom wall 65 thereof and laterally spaced from synchro 64. Switch 74 is adapted to control the feeding of signals to rotor 61 of actuator 62 from synchro 64 of the altitude selecting means and a second source of vertical guidance such as a glide path radio receiver. This selective feeding will be hereinafter discussed in detail in connection with the description of Figure 8. A selector knob 75 is provided on front wall 13 to afford manual operation of switch 74. An "off" position is included in switch 74 to prevent signals from either of the above sources being sent to rotor 61 when airplane maneuvers are required which involve neither a selected altitude nor a glide path.

Mounted on the front wall 13 of housing 11, generally directly above altitude selector knob 68, is a heading and radial selector knob 76 which effects rotation of a shaft 77 within housing 11. Shaft 77 is operatively coupled with three synchros 78, 79, and 81 encased in a common housing 82 which is suitably supported by the top wall 83 of housing 11. These synchros are diagrammatically illustrated in Figure 8 and their purposes will be hereinafter explained. As shown in Figure 8, shaft 77 is coupled to the rotor 84 of VOR radial selector synchro 78, rotor 85 of selected heading deviation signal resolving synchro 79, and powered rotor 86 of heading selector synchro 81. Also coupled to shaft 77, as by suitable gearing 87, is a mechanical counter 88 of conventional construction which is mounted from the top wall 83 of housing 11. Mechanical counter 88 is provided to afford a showing of both the selected magnetic heading and the reciprocal thereof and also to indicate to the pilot the direction of a selected radial through radio transmitter in use.

A compass rose 91 is positioned in housing 11 between the window 14 and the cylinder 23. Compass rose 91 comprises a disk 92 formed of a suitable transparent plastic material and having a circular aperture 93 therethrough. Annularly disposed indications 94 are provided on the face of disk 92, these indications 94 correspond to degree or compass markings.

To mount the compass rose 91 in the desired position and for rotative movement there is provided, as best shown in Figure 5, a mounting ring 95 which is supported by a pair of rotatable shafts 96 and 97. Shaft 96 is rotatably supported by bearings 98 carried by a pair of spaced lugs 101 extending outwardly from gimbal arm 26. In like manner, shaft 97 is rotatably supported, by means of bearings 102 carried by a pair of projecting lugs 103 provided by gimbal arm 27.

Four gears 104, 105, 106 and 107, in annularly spaced relation, are carried by mounting ring 95. Only gear 104 of these gears is a drive gear, it being fixed, in suitable manner, to the rotatable shaft 96, which passes through drive gear 104 so that gear and shaft rotate together. Compass rose 91 is provided with a series of teeth in its peripheral surface, as shown at 108, for cooperation with the teeth of the annularly arranged gears 104, 105, 106 and 107 carried by mounting ring 95. These gears between them through their engagement with the teeth on the peripheral surface of compass rose 91 rotatably maintain the compass rose 91 in position.

Positioned immediately in front of compass rose 91 is a rotatable ring member 109 carrying an arrow indicator 111. Indicator 111 cooperates with the attitude indicator and compass rose 91 to indicate the bearing and magnetic bearing from the airplane to either a selected omnidirectional radio range transmitter by means of a radial converter or any other radio source by means of a radio compass receiver (both to be described) in response to signals delivered therefrom. Indicator 111 is also adapted to align with the magnetic north when the airplane is being guided in azimuth solely by compass. Markings are provided on window 14 and on the instrument casing around it for use with arrow indicator 111 in performing certain maneuvers of the airplane, as will be described. As shown, these markings comprise a line, indicated at 110, which represents the rudder and vertical fin of the airplane and extends from circle 19 normal to line 22 which forms the wings of airplane 18 and the angle marks 100 on the instrument casing around the window. To rotatively support ring member 109, there is provided a gear 112 and three idler gears 113, 114 and 115. These gears are annularly spaced about the ring member 109 and are adapted to engage with teeth 116 on the peripheral surface thereof. Drive gear 112 is rigidly fixed to the end of rotatable shaft 97 for rotation therewith to effect rotative movement of ring member 109. Idler gear 113, horizontally spaced from gear 112, is rotatably supported on an extension of shaft 96, while the other idler gears 114 and 115 are mounted for free rotative movement respectively upon fixed shafts 117 and 118 carried by and projecting forwardly from mounting ring 95 which supports compass rose 91.

A radio beam indicator 119 is disposed forwardly of compass rose 91 and ring member 109 and is arranged for movement laterally across the window 14 and the face of the compass rose 91. The radio beam indicator 119 comprises a wire 120 shaped to resemble a section of a radio beam in accordance with the accepted method of representing radio beams on airway charts. It is so proportioned that it will loosely bracket the black circle 19 representing the fuselage of the miniature airplane 18. By this means an airplane, when flown on a localizer radio beam, will land on a runway if the airplane is flown by the pilot in such a manner as to maintain the miniature airplane's fuselage 19 within the confines of indicator 119.

Radio beam indicator 119 is affixed, at its smaller end, to the free end 121 of an actuating arm 122, whose opposite end 123 is secured to rotor 124 of an azimuth guidance deviation actuator 125. A counterbalance 126 is mounted at end 123. Direct current is afforded stator 127 of actuator 125 from a suitable power source (not shown). Rotor 124 of deviation actuator 125 will respond to deviation signals from any of the available azimuth guidance sources, some of which are to be described, to rotate actuating arm 122 thereby to effect the lateral movement of radio beam indicator 119 across the window 14 and compass rose 91. When the deviation actuator 125 is not in use, radio beam indicator 119 may be utilized as an indicator of the angular position of any selected heading; it can also be employed for reading quickly any of the commonly used azimuth angles in procedure turns and in pattern flying generally. For this and other purposes, the reference marks, denoted generally by numeral 100, are shown located at the top and about the periphery of window 14 on front wall 13 at 30, 45, 90 and 135 degree angles to the right and left and at a 180 degree angle for illustrative purposes. Additional roll and azimuth angles will need markings as air traffic and air traffic control increase.

Azimuth guidance deviation actuator 125 is supported at the end of an arm 128 and is adapted to be rotated, as a unit, by arm 128 about shaft 29 which mounts the gimbal frame 25. The length of arm 128 is sufficient that deviation actuator 125 and the actuating arm 122 supported thereby will, in their rotative movement about shaft 29 clear the spaced gimbal arms 26 and 27 and the ends of cylinder 23. Attention is directed to Figure 4 which shows deviation actuator 125 and actuating arm 122 spaced 90° from the positions occupied by these members in Figure 2. These two figures serve to illustrate the relative positions of these movable members to the other elements within housing 11 which permits them to freely rotate within the housing.

Arm 128, which supports deviation actuator 125, is itself supported at its lower end 130 on bearing member 131 which is rotatively fitted upon gimbal frame shaft 29. Lower end 130 of arm 128 is secured to rotor 132 of a heading signal responsive synchro 133 positioned on shaft 29. Thus as rotor 132 responds to signals transmitted to it, rotation of arm 128 will be effected to rotate therewith deviation actuator 125, actuating arm 122 and radio beam indicator 119.

Stator 134 of synchro 133 is connected to a disk 135 supported by a bearing member 136 for rotative movement upon gimbal frame shaft 29. Positioned adjacent a face 137 of disk 135 is a compass signal responding synchro 138. Stator 139 of synchro 138 is affixed to the bight portion 28 of gimbal frame 25 and its rotor 141 is attached to the face 137 of disk 135. Disk 135 is notched about its peripheral surface to provide a series of teeth, as shown at 142, which teeth are adapted to mesh with a gear 143 fixedly mounted at the end of rotatable shaft 96. It is readily apparent that as rotor 141 rotates, when actuated by compass signals transmitted thereto, disk 135 will be made to turn and to actuate gear 143 to rotate shaft 96. Drive gear 104, carried by shaft 96 adjacent compass rose 91, will thereby be rotated to effect rotative movement of disk 92 which comprises compass rose 91 in unison with disk 135. The compass signals fed to synchro 138 are phased, as will be further described, to provide that the magnetic heading of the airplane is located at the vertical on disk 135 and is to be read at the vertical on compass rose 91, and to further assure that the position of the indicia corresponding to directions will be always geographically correct on rose 91.

Located within cylinder 23 is a distance measuring synchro 144 having its stator 145 connected to the interior wall surfaces of cylinder 23 by oppositely extending brackets 146. Its rotor 147 is rotatively supported by a bearing 148 on through shaft 38. A conventional mechanical counter, shown generally in Figure 4 by the numeral 151, is afforded to provide an indication of the distance in miles from a transponder to which a signal is being beamed by equipment to be further described. Counter 151 embodies a plurality of disks 152 suitably marked with numerals on their periphery and supported by bearings 153 for rotative movement on through shaft 38. Appropriate gearing 154 interconnects the various disks 152 to effect desired intermovement therebetween. One disk 152a is attached to rotor 147 so that as it rotates in response to an actuating signal it will move disk 152a. This latter disk in turn will through gearing 154 effect movement of the other disks 152 to position them to provide, through the numerals carried on their periphery, a reading of distance to the signal source. The wall of cylinder 23 is slotted as at 155 to permit the numbers carried on the periphery of disks 152 and 152a to be read through window 14.

To effect rotation of ring member 109 which supports arrow indicator 111 for denoting bearings, there is provided a synchro 156. Synchro 156 has its stator 157 suitably mounted on bight portion 28 of gimbal frame 25 and its rotor 158 geared to rotatable shaft 97 through a suitable gearing system contained in gear box 150 affixed to arm 27 of gimbal frame 25. When bearing signals are received by synchro 156, it will, in cooperation with the gearing in gear box 150, effect rotative movement of shaft 97 to actuate drive gear 112 mounted on the opposite end of shaft 97 to drive ring member 109 in unison with rotor 158.

A track resolving synchro 159 is disposed within housing 11 between rear wall 33 and cylinder 23. It embodies a stator 160 carried by a disk 161 affixed to shaft 29 and a rotor 162 which is affixed to arm 128 which supports deviation actuator 125. Arm 128 serves to stabilize rotor 162 in the angular position of a selected heading, as will be further explained. Rotor 162 carried by arm 128 includes two mutually normal pickup coils 163 and 164, as shown in Figure 8, with coil 163 aligned so that its null and phase reversal position is stabilized in the angular position of the selected heading and coil 164 will have its null and phase reversal position stabilized normal to the selected heading position.

Radio track and heading deviation signals are shown directed to deviation actuator 125 to deflect radio beam indicator 119 through a self-contained five-position, seven pole azimuth guidance selector switch 165, of conventional construction, suitably mounted in housing 11 adjacent its top wall 83. The manner in which these signals are transmitted through switch 165 and the effect of such signals will be hereinafter described. A selector knob 166 mounted upon front wall 13 operates switch 165 and determines which of the available azimuth guidance signals received from remote sources are to be transmitted to the deviation actuator 125. Associated with switch 165 and positioned within housing 11 rearwardly of switch 165 is a solenoid actuated, four pole reversing switch 167 (diagrammatically shown in Figure 8) which serves to reverse the polarity of the selected heading signal and reverses the polarity of the azimuth guidance deviation signals to actuator 125 when an airplane flies past a transmitter broadcasting a beam, to reverse the position of the radio beam indicator 119 with respect to the disk 135, the window 14, the attitude indicator and compass rose 91 and to reverse the sensing of the displacement of the radio beam indicator 119 from its selected heading position simultaneously.

Mounted on front wall 13 of housing 11 is an indicator light 168 which assists in locating the airplane with respect to an airway. Light 168 responds to signals transmitted by radio marker beacons positioned along a radio beam and when glowing indicates that the airplane is flying over one of these marker beacons.

Also carried by front wall 13 of housing 11, positioned immediately below indicator light 168, is a conventional damped, pendulous ball-type skid indicator embodying a ball in a liquid filled, closely fitting curved tube as shown at 169. Skid indicator 169 is employed in all the maneuvers of the aircraft and serves to indicate when a skid occurs during the flight of an airplane, whereupon the pilot makes the necessary rudder movement to correct for this adverse condition.

The various electrical leads for channeling signals and energy to the electrical devices embodied within housing 11 of instrument 10 have not been shown in the representation of the invention illustrated by Figures 1–7 since the number of such leads obviously is large. They have been omitted to permit a clearer illustration of and a more ready understanding of the construction of the instrument 10. Figure 8 is designed to illustrate diagrammatically the wiring involved in the present instrument. Figure 8 further illustrates the wiring between the electrical devices embodied in instrument 10 and some of the various remotely located sources of signals that may be used for guidance and an energy source.

Explanation of the operation of instrument 10 will now be had and will be afforded in connection with Figure 8 which diagrammatically illustrates the instrument 10 in association with a group of conventional aircraft flight directing and landing devices.

These devices shown comprise an ADF (Automatic Direction Finder) receiver 171, a VOR (Very high frequency Omnidirectional Radio Range) receiver 172, a VOR (Very high frequency Omnidirectional Radio Range) radial converter 173, a compass synchro 174 carrying the signals of a conventional gyrostabilized magnetic compass, not shown, a radio marker beacon receiver 175, a distance measuring equipment synchro 176 which is associated with any available distance measuring equipment, not shown, a gyrovertical pitch synchro 177 which is understood to be located on the pitch gimbal of a conventional gyrovertical, not shown, an altimeter synchro 178 which transmits signals determined by an altimeter, not shown, with which it is associated, a glide path radio receiver 181, an accelerometer 182, an air speed measuring instrument 183, an angle-of-attack measuring device 184, an angle-of-attack synchro 185 operatively associated with the angle-of-attack measuring device 184, a gyrovertical roll synchro 186 carried by the roll gimbal of the same gyrovertical, not shown, which carries synchro 177 on its pitch gimbal. All of these various devices may be located at any suitable position on the airplane, it is not necessary that they be positioned on or near the instrument panel since the intelligence determined by the devices will be transmitted by suitable electrical leads to the flight instrument 10, which will make this intelligence available to the pilot. It is understood that the illustrated ADF radio receiver 171, VOR radio receiver 172, VOR radial converter 173, compass synchro 174, radio marker beacon receiver 175, DME synchro 176, the gyro pitch synchro 177, the altimeter synchro 178, the glide path receiver 181, the accelerometer 182, the air speed measuring instrument 183, the angle of attack measuring device 184 and the gyrovertical roll synchro 186 are all suitably powered by conventional energy sources, and since these sources are conventional they have not been represented.

For a better understanding of the invention, it will be noted that in Figure 8 the various devices embodied in flight instrument 10 have been segregated from the intelligence transmitting devices that are shown servicing it by a heavy dot-dash line, indicated generally by the numeral 187. Any other available guidance and safety signal sources may be used in a similar manner.

The electrical interconnections between instrument 10 and the various devices of the system illustrated in Figure 8 will now be described. As shown, the ADF radio receiver 171 is connected to the seven pole switch 165 of instrument 10 by leads 191, 192 and 193, with lead 191 being connected to contacts 194 and 195 of the switch 165, lead 192 being connected to contacts 196 and 197, and lead 193 being connected to contacts 198 and 199. The VOR radial converter has connections to switch 165 through leads 201, 202 and 203, lead 201 being connected to contact 204, lead 202 being connected to contact 205 and lead 203 being connected to contact 206. VOR radio receiver 172 is likewise electrically connected to the switch 165, the connection being through lead 207 which feeds contact 208, lead 209 connecting to contact 211, lead 212 feeding contact 213, lead 214 connected to contact 215, lead 216 joined to contact 217, and lead 218 connecting with contact 219. VOR radio receiver 172 is connected to VOR radial converter 173 by a cable 220 and is also connected by a number of leads 221 to the stator of radial selector synchro 78 in instrument 10, and by leads 222 to the rotor 81 of this synchro.

Compass synchro 174 which reacts to signals from the compass (not shown) transmits compass signals through leads 223 to the stator of synchro 79 in instrument 10. The rotor 85 thereof feeding its signals through a phase comparator 224 to leads 225 and 226 which connect respectively to contacts 227 and 228 of switch 165. Phase comparator 224, and all other phase comparators employed in the system are conventional and each serves, as is well known in the art, to provide a unidirectional output voltage whose polarity is determined by and whose amplitude is proportional to the phase of the signal developed by the action of the particular sensing device with which the synchro feeding the phase comparator is associated.

The stator of compass synchro 79 is connected by leads 231, 232 and 233 respectively to contacts 234, 235 and 236 of selector switch 165. These three leads 231, 232 and 233 are joined by leads 237 to the stator 139 of compass signal responding synchro 138 to effect operation of its rotor 141 to rotate disk 135, stator 134 of synchro 133 and compass rose 91.

It is here noted that compass synchro 174 is electrically connected and controls two synchros, one being synchro 79 and the other being synchro 138. Synchro 79 serves to provide signals that will effect movement, as will be hereinafter described, of radio beam indicator 119 laterally across the window 14 and compass rose 91 to magnify heading errors when flying on azimuth guidance by compass alone. The function of synchro 138 is to effect rotation of the disk 135, stator 134 of synchro 133 and compass rose 91 with respect to roll stabilized gimbal 25.

Heading selector synchro 81, which is positioned within instrument 10 adjacent compass signal responding synchro 79 and has its rotor 86 coupled by shaft 77 to rotor 85 of synchro 79 and rotor 84 of radial selector synchro 78 for common movement, has its stator 81a connected by leads 241 to the stator 134 of selector heading synchro 133, and has its rotor 86 joined by leads 242 and 243 respectively to contact arms 244 and 245 of reversing switch 167.

The radio marker beacon receiver 175 feeds its signals to indicator light 168 through suitable leads 246.

Distance measuring synchro 176 is shown connected by conductors 247 to the stator 145 of distance measuring synchro 144 for effecting operation of mechanical counter 151 to provide an indication of the distance to an objective.

Gyro pitch synchro 177 feeds its signals through leads 248 to the stator 43 of synchro 41, which synchro 41 serves to actuate horizon cylinder 23, rotating it about its longitudinal axis in response to changing pitch conditions.

Altimeter synchro 178 responding to change in altitude conditions directs its control signals by way of leads 251 to the stator 64a of synchro 64. Sensing rotor 66 which is connected to the altitude indicating counter 71 is additionally connected by leads 252 to a phase comparator 253. Phase comparator 253 is connected by conductors 254 and 255 respectively to contacts 256 and 257 of selector switch 74 which switch in turn feeds signals by means of leads 258 and 259 to the rotor 61 of actuator 62 which controls the operation of vertical guidance indicator 58.

Control signals for operation of rotor 61 of the vertical guidance indicator actuator 62 are also as shown obtained from the glide path radio receiver 181, which is connected by leads 261 and 262 respectively to contacts 263 and 264 of selector switch 74. Rotatable contact members 265 and 266 of selector switch 74 are actuated by selector knob 75 between an Off position at 267, the pair of contacts 256 and 257, which connect through phase comparator 253 to the sensing rotor 66 of synchro 64, and the pair of contacts 263 and 264 which receive signals from glide path radio receiver 181. Thus selector switch 74 as shown determines between synchro 64 and glide path radio receiver 181 which is to transmit signals to rotor 61 of actuator 62 to operate vertical guidance indicator 58. Vertical guidance indicator 58, responding to these signals, will assume a position above or below the artificial horizon line 24a and by its position relative to artificial horizon line 24a indicate the vertical position of the selected altitude or the selected glide path relative to the airplane utilizing instrument 10.

Overriding or safety signals are adapted to be transmitted to actuator 62 even though selector switch 74 may be sending selected altitude signals from synchro 64 or glide path signals from glide path radio receiver 181. The purpose of affording overriding signals is to indicate a safe flying range for the aircraft continuously in all flight conditions that may be encountered. The origin of the overriding or safety signals is shown as the accelerometer 182, the air speed measuring device 183, and the angle of attack measuring instrument 184. Accelerometer 182 is connected to leads 258 and 259, which connect selector switch 74 to the rotor 61 of actuator 62, by leads 268 and 269; air speed measuring device 183 is connected to the same leads 258 and 259 by leads 271 and 272; and angle of attack measuring instrument 184 is connected into the circuit to feed rotor 61 of actuator 62 by leads 273 and 274.

As stated hereinbefore, the accelerometer 182, the air speed measuring device 183, and the angle of attack measuring instrument 184 shown are conventional in construction and operation and are well known to those skilled in the art, and therefore the description offered herein of these elements will be limited and only such description will be afforded as will make readily apparent the effect of the operation of these elements on the actuator 62.

As shown, accelerometer 182 comprises a potentiometer 275 activated by a spring supported weight 276 whose motion is confined to a path normal to the airplane's roll and pitch axes by a dash pot 278, which dash pot also serves to damp the motion of weight 276. Power is provided potentiometer 275 at adjustable contacts 281 and 282 from a suitable direct current source, not shown. Potentiometer 275 is calibrated and arranged to provide no signal until such time as maximum safe normal acceleration is approached. When a signal is sent to actuator 62, indicator 58 is moved downward to warn the pilot to lower the nose of the airplane to decrease the load on its wings. Adjustable contacts 281 and 282 provide means for adjusting the signal strength of potentiometer 275.

Air speed measuring device 183 embodies a maximum safe air speed potentiometer 283 whose movable contact arms 284 and 285 are actuated by a sylphon 286. Sylphon 286 is responsive to the differential pressure developed between a pitot 287 and a static vent 288 in a standard pitot-static air speed head 291. Direct current is provided from a source not shown, to the potentiometer 283 through adjustable contacts 292 and 293. Potentiometer 283 is not operative to provide a signal until the maximum safe air speed is approached. At such time a signal is forwarded to actuator 62 to move the indicator 58 upward to warn that an unsafe air speed is being approached, the pilot then may raise the nose of the airplane or close the engine throttles thereby to decrease the air speed. The signal strength of potentiometer 283 is controled by adjustable contacts 292 and 293.

In the angle of attack measuring instrument 184 illustrated there is embodied a stalling angle of attack potentiometer 294 having movable contact arms 295 and 296 arranged for actuation by a sylphon 297. Sylphon 297 reacts to differential pressure developed between a vent 298 opening to the top surface of the airplane's wing, shown diagrammatically and indicated generally by the numeral 299, at the point of maximum camber of the wing, and a second vent 301 positioned to open to the under surface of the wing 299 at the point where the airstream separates to flow over the upper and lower surfaces of the wing at the stalling angle of attack. Current is provided to potentiometer 294 by way of adjustable contacts 302 and 303 from a usual direct current source not shown. Potentiometer 294 will provide no signal until the stalling angle of attack is approached. Such signals are as developed will operate actuator 62 to move indicator 58 downward warning the pilot to lower the nose of the airplane or to open the throttle of the engines to decrease the angle of attack. Adjustable contacts 302 and 303 control the signal strength of potentiometer 294.

From the description provided it is apparent that accelerometer 182, air speed measuring device 183, and angle of attack measuring instrument 184 are conventional. The particular construction of these devices does not form a part of the present invention and any suitable devices which will provide overriding signals to the actuator 62 when maximum safe air speed, maximum safe normal acceleration and the stalling angle of attack are approached may be employed.

It is apparent from the drawing that accelerometer 182, air speed measuring device 183, and angle of attack measuring instrument 184 are always in circuit with actuator 62. The pilot cannot switch these safety devices to an inoperative status.

Synchro 185 associated with angle of attack measuring instrument 184 has a rotor 304 which responds to the actions of instrument 184. The stator 305 of synchro 185 is connected by leads 306 to the stator 53 of synchro 52. Rotor 51 of synchro 52 controls the movements of angle of attack indicator 47 to provide an indication, through the position of indicator 47 relative to the miniature airplane 18, of the angle of attack at which the airplane is flying.

Gyrovertical roll synchro 186 may be connected by conductors 311 to the stator 45 of roll synchro 44 so that its rotor 46 effects rotation of gimbal 25 to rotate horizon cylinder 23 either clockwise or counterclockwise about its transverse axis. In the present instrument the connections are made so that the rotation of synchro 44 stabilizes in roll the various devices supported by shaft 29 and the gimbal 25, thus, the airplane may roll but the compass rose 91 and the other devices mounted on shaft 29 and on gimbal 25 do not.

Azimuth guidance deviation actuator 125, whose rotor 124 effects movement of the radio beam indicator 119 laterally across the window 14 and the face of compass rose 91, is electrically connected to reversing switch 167, this connection being effected by means of conductor 312 which connects rotor 124 to interconnected contacts 313 and 314 of switch 167, and by a conductor 315 which connects to contacts 316 and 317.

Rotative contact arm 318 of switch 167, which moves between stationary contacts 313 and 316, is connected by a lead 321 to rotatable contact arm 322 of selector switch 165. Rotative contact arm 323 of reversing switch 167, which moves between stationary contacts 314 and 317, is connected by a conductor 324 to rotatable arm 325 of selector switch 165. Power from a usual alternating current source indicated by the numeral 326 is fed by suitable leads 327 to contacts 328, 329, 331 and 332 of switch 167, contacts 329 and 331 being interconnected. Rotative contact arm 244 which is connected to rotor 86 of heading selector synchro 81 by lead 242 is adapted to move between stationary contacts 328 and 329, and rotative contact arm 245, which is connected to the same rotor 86 by lead 243, can be moved between stationary contacts 331 and 332.

Switch 167 includes a solenoid 333 which operates a common actuator 334 to effect movement of the rotative contact arms 244, 245, 318 and 323 of switch 167. Leads 335 and 336 connect solenoid 333 to rotative contact arms 337 and 338 of switch 165 for actuation by energy transmitted by VOR radio receiver 172 or by ADF receiver 171 for a purpose to be described.

Synchro 156 which effects rotation of arrow indicator 111 for denoting bearings has its stator 157 connected by leads 341, 342 and 343 respectively to rotative contact ars 344, 345 and 346 of switch 165 for receiving signals selectively from the ADF radio receiver 171 or the VOR radial converter 173. Rotor 158 of synchro 156 reacts to these signals to position arrow indicator 111 to show the bearings from the airplane to the source whose signal is being used. As was hereinbefore described, ADF radio receiver 171 transmits signals through lead 191 to contacts 194 and 195 of switch 165, which contacts are engageable by rotative contact arm 344, it also transmits signals through a lead 192 to contacts 196 and 197, these latter contacts being engageable by rotative contact arm 345, and it transmits signals through lead 193 to contacts 198 and 199, which contacts are serviced by rotative contact arm 346.

VOR radial converter 173 which also submits signals for operation of synchro 156 connects through lead 201 to stationary contact 204 which is engageable by rotative contact arm 344, through lead 202 to stationary contact 205 engageable by rotative contact arm 345, and through lead 203 to stationary contact 206 engageable by rotative contact arm 346.

Signals from ADF radio receiver 171 will be passed to bearing indicator 111 through synchro 156 when the selector knob 166 is positioned at either its ADF position or its LOC position as marked on the face of the front wall 11 of instrument 10. In the ADF position, indicator 111 points the direction to the radio transmitter to which ADF radio receiver 171 is tuned, in the LOC (or localizer) position, the indicator 111 indicates the direction to the radio marker beacon to which ADF radio receiver 171 has been tuned. Indicator 111 continues to point to the desired radio transmitting objective in all maneuvers of the airplane. In the LOC position of selector knob 166 the rotatable contact arms 322 and 325 of switch 165 will be in engagement with contacts 219 and 217, respectively, which contacts connect through leads 218 and 216 to the localizer circuit of VOR radio receiver 172. Rotatable contact arms 337 and 338 will be in their Off positions, and rotatable contact arms 344, 345 and 346 will respectively engage contacts 195, 197, and 199 connected through leads 191, 192 and 193 with ADF radio receiver 193.

In the ADF position of selector knob 166 a circuit will be completed for transmission of signals from ADF radio receiver 171 to the track resolving synchro 159. As shown, the stator 160 of synchro 159 is connected by conductors 347, 348 and 349 to stator 157 of synchro 156 which operates indicator 111, these same conductors 347, 348 and 349 are connected respectively to leads 341, 342 and 343 which connect stator 157 of synchro 156 to rotative contact arms 344, 345 and 346 of switch 165. Mutually normal pick-up coils 163 and 164 which comprise rotor 162 of track resolving synchro 159 are also electrically connected to switch 165. Coil 163, which is aligned with the angular position of the selected heading, is connected by conductors 351 and 352 to a phase comparator 353 which modifies the signals. Phase comparator 353 is in turn connected by leads 354 and 355 respectively to contacts 356 and 357 of switch 165. Coil 164, which is aligned normal to coil 163, is connected by leads 358 and 359 to a phase comparator 361, which itself is connected by leads 362 and 363 respectively to contacts 364 and 365 of switch 165.

Rotating the selector knob 166 to the ADF position actuates the rotatable contact arms of switch 165 to position its arms 344, 345 and 346 into engagement with contacts 194, 196 and 198 which are in circuit with ADF radio receiver 171, contact arms 322 and 325 are moved to engage contacts 357 and 356 which connect to phase comparator 353 electrically associated with coil 163 of rotor 162, and contact arms 338 and 337 are engaged with contacts 365 and 364 which are electrically joined to phase comparator 361 which connects with coil 164 of rotor 162.

Coils 163 and 164 may be utilized to define a track toward and away from any radio transmitter on a selected magnetic heading. The signal from coil 163 is adapted to act through switch 165 and switch 167 to cause deviation actuator 125 to effect movement of the radio beam indicator 119 laterally toward the selected track when the airplane is not flying on that track. Synchros 81 and 133 always rotate deviation actuator 125 bodily to rotate radio beam indicator 119 relative to disk 135 and compass rose 91 to align the indicator 119 with the angular position of the selected heading from the airplane's current heading at the vertical on disk 135 and on rose 91. The signal in coil 163 is zero only when the airplane is flying on the selected heading or its reciprocal, toward or away from the radio transmitter, at which time the null in coil 163 aligns with the null in the bearing signals in stator 160 of direction synchro 159. The signal in coil 164 will change its polarity when the airplane flies past or over the radio transmitter since this coil is stabilized with its null normal to the angular position of the selected heading. Its signal is transmitted by way of switch 165 to leads 335 and 336 to the solenoid 333 to activate it whenever the airplane flies past or over the radio transmitter. Therefore, the connection of coil 164 is such that it will provide the signals for aligning the smaller end of radio beam indicator 119 with the angular position of the inbound heading of the selected track on disk 135 and on the compass rose 91.

A brief summation of the function and purpose of the various synchros and actuators embraced in the system illustrated in Figure 8 will now be provided to make more evident the operation of the instrument.

Pitch control synchro 41, whose rotor 42 is connected to cap 34 of horizon cylinder 23, serves to rotate horizon cylinder 23 about its longitudinal axis on pitching movements of the airplane. An indication of the pitch angle is afforded by parallel lines 24, including an artificial horizon line 24a, provided on cylinder 23. These lines are read against the miniature airplane 18 on window 14 and the 90 degree angle marks on the instrument casing on each side of the window. Signals for effecting actuation of rotor 42 of pitch control synchro 41 are derived from the gyrovertical pitch synchro 177. The pitch signals may be connected so that cylinder 23 rotates either clockwise or counter clockwise. In the present instrument the signals are connected so that the direction of rotation causes line 24a to simulate the natural horizon.

Roll synchro 44, adapted to rotate gimbal frame 25, is afforded to stabilize, in the rolling movements of the airplane, the various devices supported by shaft 29 and gimbal frame 25, such as horizon cylinder 23 which will be rotated about its transverse axis, and compass rose 91 which will be rotated relative to the airplane to maintain its angular position with respect to the horizontal lines on cylinder 23. Rotation of gimbal frame 25 is effected by rotor 46, of synchro 44, secured to shaft 29 which mounts gimbal frame 25. The signals for operating rotor 46 are provided by gyrovertical roll synchro 186. Thus, since the artificial horizon is stabilized in both pitch and roll, the airplane's attitude with respect to the earth is continuously apparent to the pilot by the position of artificial horizon 24a and the other parallel lines 24 on cylinder 23 with respect to the miniature airplane 18 and the angle marks 100 on the instrument casing around the window 14.

Indication of the angle of attack of an airplane, i.e. the attitude of the airplane with respect to the air through which it is flying, is a function of synchro 52. Synchro 52 operates to rotate angle of attack indicator 47. Rotation of indicator 47 is effected by rotor 51 of synchro 52, rotor 51 being mounted on horizon cylinder shaft 38 and secured to one end of support arm 49 which carries indicator 47. The symbol, zero, and the various markings 57 applied to the face of the indicator 47 are read against circle 19, which represents the fuselage of miniature airplane 18, to measure the various angles of attack of the airplane carrying instrument 10. The signals for effecting operation of rotor 51 are supplied by synchro 185 whose own rotor 304 responds to the actions of angle of attack measuring instrument 184.

Actuator 62 operates to position vertical guidance indicator 58 toward a selected altitude or path desired to be reached by the airplane. The position of indicator 58 relative to artificial horizon line 24a provides an indication of the vertical position of the selected altitude or path with respect to the actual airplane. It will inform the pilot how to pitch the airplane, that is, whether to raise or lower the nose, in order to achieve the selected altitude or path. When the nose of the airplane is raised or lowered in a climb or dive by operation of the elevators of the airplane, and the miniature airplane 18 is maintained bracketed by indicator 58, the actual airplane will be moving toward the selected altitude or path. As the airplane approaches the selected altitude or path, indicator 58 will move toward artificial horizon 24a and by maintaining the bracketing relationship between miniature airplane 18 and indicator 58 the actual airplane is brought to the attitude that will maintain it at the desired altitude or maintain it centered in a desired path. When the airplane attains the desired path no further signal is being provided the rotor 61 of actuator 62 and indicator 58 will lie opposite artificial horizon 24a. Indicator 58 is carried by rotatable arm 59 which is connected to rotor 61 of actuator 62. Rotor 61 itself is rotatably supported on cylinder shaft 38. Thus the vertical position of the airplane with respect to the selected altitude or path is always indicated by the position of indicator 58 relative to the artificial horizon 24a.

As shown the signals which actuate rotor 61 of actuator 62 to position vertical guidance indicator 58 toward a selected altitude or toward a selected glide path are provided by synchro 64 and glide path receiver 181. Rotor 66 of synchro 64 is operable by altitude selector knob 68 through a shaft 67 and when operated by knob 68 forwards a signal to actuator 62 to effect positioning of vertical guidance indicator 58. Counter 71 is geared to shaft 67 and provides an indication of the selected altitudes. Stator 64a of synchro 64 itself receives signals from altimeter synchro 178 operated by the aneroid in an altimeter in the airplane. As shown, selector switch 74, operated by knob 75, controls and determines the feeding of the vertical guidance signals from synchro 64 and glide path receiver 181 to actuator 62 which operates indicator 58. When rotative contact arms 265 and 266 of switch 74 are in engagement with stationary contacts 256 and 257 synchro 64 is placed in circuit with actuator 62 and when these contact arms are moved to engage stationary contacts 264 and 263 the glide path receiver 181 is permitted to feed signals to actuator 62. The signals provided actuator 62 are phased so that indicator 58 rises above artificial horizon line 24a when the selected altitude or selected glide path is above the actual airplane and falls below artificial horizon line 24a when they are below the airplane. The signals are also regulated in strength so that the maximum deflection upward of indicator 58 defines a safe climbing angle for the airplane and the maximum deflection downward of indicator 58 defines a safe dive. Actuator 62 is shown actuable by the accelerometer 182, air speed measuring device 183 and angle of attack measuring instrument 184, which are adapted individually or in unison to forward signals to it which override the selected altitude or glide path signals and warn the pilot.

Azimuth guidance deviation actuator 125 controls the movement of radio beam indicator 119 laterally across the window 14 and compass rose 91. Radio beam indicator 119 will bracket circle 19, representing the fuselage of miniature airplane 18, when the actual airplane is flying on a radio beam and is being controlled by the pilot so as to maintain the actual airplane within the radio beam, and will lie to one side or the other of miniature fuselage 19 when the airplane is not within the radio beam. Radio beam indicator 119 is carried by actuating arm 122 which is mounted on rotor 124 of actuator 125. Actuator 125 is itself supported on an arm 128 rotatively mounted on gimbal frame shaft 29, for a purpose to be described. As shown when a selected compass heading is the sole azimuth guidance source, activation of rotor 124 to move radio beam indicator 119 laterally across the window 14 and the face of compass rose 91 and deflect it from the selected heading position when the actual airplane is not flying the heading is afforded by selected heading deviation signals transmitted by the rotor 85 in compass synchro 79; when azimuth guidance by radio signals is in use and the actual airplane is not flying on the selected radio beam, activation may be afforded alternately by radial deviation signals from the VOR receiver 172, by localizer deviation signals from the same VOR receiver 172, or by track deviation signals from coil 163 in ADF track resolving synchro 159. Each of these signals is transmitted first to the five position selector switch 165 and therefrom to reversing switch 167, rotor 124 of actuator 125 being connected to the latter switch. Which of the azimuth guidance signals in use is to be transmitted to actuator 125 is determined by selector knob 166 of switch 165, appropriate markings, as shown in Figure 1, being arranged on front wall 13 of housing 11 about the knob to permit the pilot to select the desired source. Compass synchro 79 is itself activated by compass synchro 174 which is an element of the airplane's compass. Selected heading deviation signals from rotor 85 in compass synchro 79 are passed through phase comparator 224 and therefrom to contacts 227 and 228 of switch 165. When selector knob 166 is turned to CMP (compass) rotative contact arms 322 and 325 of switch 165 engage these contacts and the signals are passed by leads 321 and 324 to the rotative contact arms 318 and 323 of switch 167 which transmits them to rotor 124 of actuator 125 to effect deflection of radio beam indicator 119. Radial deviation signals from VOR receiver 172 are transmitted from the radial circuit of this receiver by leads 212 and 214 to contacts 213 and 215 of switch 165. When selector knob 166 is turned to VOR, rotative contact arms 322 and 325 thereof forward these signals to rotative contact arms 318 and 323 of switch 167 and therethrough to actuator 125 for deflection of radio beam indicator 119. Localizer deviation signals from the localizer circuit of VOR radio receiver 172 are channelled by leads 216 and 218 to contacts 217 and 219 of switch 165, when selector knob 166 is turned to LOC, and by the rotative contact arms 322 and 325 are transmitted by leads 321 and 324 to rotative contact arms 318 and 323 of switch 167 for transmission to actuator 125, again for deflection of radio beam indicator 119. Bearing signals from the ADF circuit are submitted by ADF radio receiver 171 through leads 191, 192 and 193 respectively to stationary contacts 194, 196 and 198 of switch 165 which rotative contact arms, 344, 345 and 346 are adapted to engage. When selector knob 166 is turned to ADF, these signals are forwarded by the latter arms and leads 347, 348 and 349 to the stator 160 of track resolving synchro 159. Rotor 162 of this latter synchro is affixed to arm 128 which supports deviation actuator 125. Rotor 162 has two coils 163 and 164, mutually normal to each other. The track deviation signals from coil 163 are transmitted through phase comparator 353 and therefrom through leads 354 and 355 to stationary contacts 356 and 357 of switch 165. Rotative contact arms 322 and 325 when in engagement with these contacts send the signals on to switch 167 through leads 321 and 324. Rotative contact arms 318 and 323 of the latter switch then transmit them to deviation actuator 125 for deflection of radio beam indicator 119.

Radio beam indicator 119 is adapted to be aligned with its smaller end at the angular position of the selected magnetic heading on disk 135 and on compass rose 91. As was hereinbefore stated, the actual magnetic heading of an airplane is located at the vertical on disk 135 and is read at the vertical on the compass rose 91. An extension of normal line 110 on miniature airplane 18 would pass through that reading only when the airplane's wings are level. Heading selector synchro 81 in cooperation with heading signal responsive synchro 133, attached to disk 135, provide the signals for effecting alignment of indicator 119 with the angular position of the selected magnetic heading. Heading selector synchro 81 has its powered rotor 86 controlled by selector knob 76. Counter 88 associated with synchro 81 and knob 76 permits the pilot to select a heading. This heading and its reciprocal will appear on the counter 88 on the face of the instrument. The heading signals are transmitted from stator 81a of heading selector synchro 81 through leads 241 to the stator 134 of heading signal responsive synchro 133 to effect operation of rotor 132 thereof. Rotor 132 is rotatively supported on gimbal frame shaft 29 and is connected to the lower end of arm 128 which supports actuator 125 which, as has been stated, supports radio beam indicator 119. Rotor 132 of synchro 133 positions arm 128 to control the angular position of actuator 125 and radio beam indicator 119 relative to disk 135 and compass rose 91 to align the smaller end of the latter with the angular position of the selected magnetic heading on disk 135 and on compass rose 91. When the pilot desires to fly the airplane on the selected heading, he will roll the airplane toward the selected magnetic heading by rolling the miniature airplane 18 toward the smaller end of the indicator 119.

Knob 76 which rotates rotor 86 of heading selector synchro 81 and rotor 85 of compass synchro 79 also rotates rotor 84 of radial selector synchro 78 to select a radial on the selected heading in connection with VOR radio receiver 172.

Provision is afforded in the present invention to assure that radio beam indicator 119 will always align its smaller end with the angular position of the inbound heading of the selected radial when a VOR radio transmitter with VOR radio receiver 172 or any radio transmitter with ADF radio receiver 171 is being employed for the airplane's azimuth guidance. Thus if the airplane should fly past or over the source of the radio signals the position of the radio beam indicator 119 will be reversed, that is, turned top for bottom, with respect to disk 135, the window 14, the attitude indicator and compass rose 91, and will always align its smaller end with the angular position of the inbound heading. Reversal of radio beam indicator 119 to achieve this effect is attained in the following manner: if the VOR radio receiver is being employed selector knob 166 of switch 165 will be actuated to position rotative contact arms 338 and 337 in engagement with stationary contacts 208 and 211 to receive signals by way of leads 207 and 209 from the ambiguity circuit of VOR radio receiver 172. These signals are transmitted by leads to solenoid 333 of reversing switch 167 for effecting operation of the rotative contact arms of the latter switch. Heading selector synchro 81 at the same time is connected by way of leads 242 and 243 to reversing switch 167 to receive power from source 326. When the airplane flies over, or past, the radio source the signal from the ambiguity circuit of VOR radio receiver 172 effects an operation of the movable contact arms in switch 167 to reverse the polarity of the signals being provided rotor 86 of heading selector synchro 81. This reverses the polarity of the signals provided heading signal responsive synchro 133 to cause its rotor 132 to rotate arm 128 through 180°. Since radio beam indicator 119 is supported on arm 128 through actuator 125 it therefore will be turned end for end and its smaller end will again be aligned with the angular position of the inbound heading on disk 135 on compass rose 91. It is noted that actuation of solenoid 333 causes the polarity of the signals fed to actuator 125 also to be changed so that the sensing of radio beam indicator 119 is thereby changed when it has been rotated 180° to align its smaller end with the angular position of the inbound heading.

When the ADF radio receiver 171 is being used with a desired radio transmitter for airplane guidance selector knob 166 will be positioned to bring rotative contact arms 344, 345, and 346 of switch 165 into engagement with contacts 194, 196 and 198 which are in circuit with ADF radio receiver 171, contact arms 338 and 337 will be engaged with contacts 365 and 364 which are in circuit with coil 164 of rotor 162 of the track resolving synchro 159, and contact arms 322 and 325 are engaged with contacts 357 and 356 which are in circuit with coil 163 of track resolving synchro 159. Bearing signals from ADF radio receiver 171 will pass by way of contact arms 344, 345 and 346 to the stator 160 of synchro 159 through connecting leads. Stator 160 is fixed to gimbal frame shaft 29 so that these bearing signals are stabilized in roll by the stabilizing synchro 44. As stated hereinbefore, rotor 162, comprising mutually normal coils 163 and 164, is secured to arm 128 which supports deviation actuator 125 so that the rotor 162 is stabilized in the angular position of the selected heading. Coil 163 is so aligned that its null and phase reversal position is stabilized in the angular position of the selected heading and coil 164 will have its null and phase reversal position stabilized normal to the selected heading position. Coil 164 sends its signals by way of phase comparator 361 and leads 362 and 363 to rotative contact arms 338 and 337 which in turn forward the signals through leads 336 and 335 to solenoid 333 to effect actuation of solenoid 333, whenever the airplane flies over or past the radio transmitter, to reposition the movable contact arms in reversing switch 167. This will change the polarity of the signals being sent from switch 167 by way of leads 242 and 243 to rotor 86 of heading selector synchro 81. Heading selector synchro 81 will then send signals of a changed polarity to heading signal responsive synchro 133 whose rotor 132 is then activated to rotate arm 128 through 180°. Since arm 128 carries actuator 125 and radio beam indicator 119 these are rotated to a like degree. Radio beam indicator 119 will then be again positioned with its smaller end aligned with the angular position of the inbound heading. When solenoid 333 was actuated it moved contact arms 318 and 323 to thereby change the polarity of the signals fed to actuator 125. In this manner the sensing of radio beam indicator 119 is changed to compensate for its 180° rotation.

It is noted that solenoid 333 of reversing switch 167 is not placed in an operative circuit when selector knob 166 of switch 165 occupies CMP (compass), LOC (localizer signal) or "off" positions, as shown on the face of the instrument. Solenoid 333 is only available for effecting polarity changes when the ADF radio receiver 171 or the VOR radio receiver 172 are being used for the airplane's azimuth guidance.

Indication of the bearings from the airplane to the radio source being used for airplane guidance is a function of synchro 156 which effects the operation of arrow indicator 111 to point it toward the radio source whose signal is being utilized. The angle between the actual heading of the airplane at the vertical and the position occupied by arrow indicator 111 is the bearing from the airplane to the radio source being employed. Arrow indicator 111 is mounted on rotatable ring member 109 which is adapted to be driven by drive gear 112 affixed to shaft 97 carried by gimbal frame 25. Rotor 158 of synchro 156 is connected to shaft 97 by gear box 150, while stator 157 is positioned on the bight portion 28 of gimbal frame 25. It is to be noted that mounting the rotor 158 and stator 157 of synchro 156 on gimbal frame 25 so that they rotate in space as gimbal frame 25 rotates during rolling movements of the airplane in response to control signals of gyrovertical roll synchro 186 and roll stabilizer synchro 44 stabilizes synchro 156 and does not permit it to roll with the airplane. As shown signals for effecting movement of rotor 158 of synchro 156 and thereby effecting rotation of indicator 111 are provided by either the ADF radio receiver 171 or the VOR radial converter 173, dependent upon the radio source whose signal is being used. Selector switch 165 selects the actuating signals to be employed. The VOR radial converter 173 will feed signals when selector knob 166 positions rotative contact arms 344, 345, and 346 of switch 165 in engagement with contacts 204, 205 and 206 with which the VOR radial converter 173 is in circuit. These signals are transmitter by arms 344, 345, and 346 to leads 341, 342, and 343 which connect to the stator 157 of synchro 156. Rotor 158 reacts to these signals to position arrow indicator 111 to provide an indication of the bearings from the airplanes to the selected VOR radio transmitter being used for guidance.

As has been mentioned hereinbefore, the ADF radio receiver 171 passes signals for activation of rotor 158 and arrow indicator 111 when selector knob 166 is positioned in either the ADF or LOC positions. In the ADF position, indicator 111 will be pointed to the radio transmitter to which ADF radio receiver 171 is turned. In the LOC position indicator 111 points to the radio marker beacon to which the ADF radio receiver is tuned. In this latter position deviation signals are provided by the localizer circuit in VOR radio receiver 172 through leads 216 and 218 to rotative contact arms 322 and 325 and passed thereby through leads 321 and 324 to rotative contact arms 318 and 323 of reversing switch 167 for transmission to actuator 125 which deflects radio beam indicator 119 from its selected heading position. Also in this latter position the ADF radio receiver passes signals through leads 191, 192 and 193 to stationary contacts 195, 197 and 199 so that when rotative contact arms 344, 345 and 346 are in engagement with these stationary contacts the signals will be transmitted through leads 341, 342 and 343 to stator 157 of synchro 156. Rotor 158 will then react to position arrow indicator 111 to provide an indication of the bearings from the airplane to the radio marker beacon being used. When selector knob 166 is rotated to the ADF position the ADF receiver 171 passes its signals through leads 191, 192 and 193 to contacts 194, 196 and 198 of switch 165. Rotative contact, arms 344, 345 and 346 will be engaged with the last mentioned contacts and the signals will be channelled through leads 341, 342 and 343 to stator 157 of synchro 156 for activating its rotor 158 to position arrow indicator 111 to afford an indication of the bearings from the airplane to the radio transmitter being utilized.

The actions and purposes of radio marker beacon receiver 175 and the DME synchro 176 have been explained hereinbefore in sufficient detail for complete understanding.

At this point the effect of positioning the selector knob at one of the various positions marked about it will be explained, except for positioning at either the ADF or LOC settings since these settings have been sufficiently explained for complete understanding of the actions secured.

Assuming selector knob 166 to be in the "off" position, radio beam indicator 119 will align with the angular position of the selected headings (reciprocals) on disc 135 and on compass rose 91, as indicated by counter 88, the heading signals being transmitted by heading synchro 81 to heading signal responsive synchro 133, whose rotor 132 is connected to arm 128, to activate arm 128 which carries actuator 125 and radio beam indicator 119. Compass rose 91 and beam indicator 119 will rotate together as the airplane maneuvers since stator 134 of heading signal responsive synchro 133 and rotor 141 of compass signal responding synchro 138 are secured to the same disk 135, which disk 135 rotates on gimbal frame shaft 29 and actuates drive gear 104 to rotate compass rose 91. Since both will rotate about gimbal frame shaft 29 the smaller end of radio beam indicator 119 and one of the selected headings on compass rose 91 will appear at the top of the instrument dial when the airplane is flying on that heading only when its wings are level. Any roll of the airplane will show on the face of the instrument dial an apparent change of heading by the amount of the roll angle, before the airplane has started to turn to that apparent heading as a result of the roll. Any small deviations from the desired heading are corrected by rolling the airplane, as indicated by miniature airplane 18, toward the desired heading at the smaller end of the radio beam indicator 119 until the desired heading at this smaller end appears at the top of the dial. The gyrovertical stabilizes the disk 135 and compass rose 91 in roll since stator 139 of compass synchro 138 is attached to the gimbal frame 25. The disk 135 and compass rose 91 therefore rotate with respect to the artificial horizon only in response to compass signals rather than with respect to the instrument case which is attached to the airplane. The actual airplane will turn toward the desired heading at a progressively decreasing angular rate and with a progressively decreasing roll angle, both angles becoming zero when the desired heading is attained. Figure 9 diagrammatically illustrates the actions above discussed. The angle marks 100, the attitude indicator and radio beam indicator 119 have been omitted for clarity. In "a" the airplane is shown in level flight and the heading is 240 degrees. In "b" the airplane has been rolled 30 degrees right without turning. The true heading is 240 degrees, as read at the vertical, but the apparent heading is 270 degrees, as read at the top of the dial. Small changes in heading are made by rolling the airplane until the desired heading is at the top of the dial and then regulating the roll to maintain it there while the airplane turns to the new heading and rolls back to level flight at the same time. With this arrangement one degree of roll angle is provided for each degree of heading change that is desired and the approach to the desired heading is always asymptotic.

An aircraft's rate of change of heading is proportional to its roll angle. By arranging for the compass rose to rotate about an axis parallel with the aircraft's roll axis and by using roll signals to indicate the aircraft's roll angle on the compass rose, the roll angle may be made equal to any desired small change of heading to produce an asymptotic approach to that heading.

In "c" the airplane has rolled left 30 degrees without turning. The true heading is 240 degrees, read at the vertical, but the apparent heading is 210, read at the top of the dial. If this action of the airplane was the result of an undesired roll in rough air and the desired heading is still 240 degrees, the airplane is immediately rolled right until that heading is again at the top of the dial and the roll is then regulated to maintain it there.

If a large change of heading is to be made, the airplane is rolled toward that heading at any desired roll angle by rolling the appropriate angle mark on the instrument casing to the vertical on the attitude indicator and maintaining it there until the resulting turn has rotated the new heading to the top of the instrument dial. The airplane at that moment still has an azimuth angle equal to its roll angle, through which it must turn to reach the desired heading; by regulating the roll angle to maintain the desired heading at the top of the dial, the roll angle and the rate of turn decrease to zero simultaneously and at similar rates and the apparent heading becomes the actual heading. While selector knob 166 is in the "off" position and deviation actuator 125 is deactivated, radio beam indicator 119 can be used as the indicator for any selected heading and reading the compass rose is unnecessary since counter 88 is used to select the heading. It is also useful for quick reading of the commonly used azimuth angles, as indicated by the markings 100, in procedure turns and in pattern flying.

With selector knob 166 turned to CMP (compass) position, switch 165 passes selected heading deviation signals received from rotor 85 in compass synchro 79 to switch 167 for channelling to the rotor 124 of actuator 125 which moves radio beam indicator 119 laterally relative to the window and compass rose 91. The combined action of the compass signals passed by the stator of synchro 79 to compass signal responding synchro 138 whose rotor 141 is attached to disk 135 which drives compass rose 91 and the selected heading signals transmitted by heading selector synchro 81 to heading signal responsive synchro 133, aligns radio beam indicator 119 with the angular position of the selected heading and its reciprocal on disk 135 and on compass rose 91. But indicator 119 will be deflected laterally from that position when selected heading deviation signals are forwarded through switches 165 and 167 to the rotor 124 of actuator 125, so that it becomes, in effect, a vernier, causing small deviations from the selected heading to appear to be large. By rolling the airplane toward the smaller end of the indicator 119, heading corrections are easily made that are too small to be particularly noticeable on compass rose 91 which is used as a secondary reference only when flying on a selected heading. This arrangement is of particular benefit where extremely accurate magnetic headings must be flown.

If the airplane is to be flown on VOR, the condition shown in Figure 8, selector knob 166 of switch 165 is positioned at VOR, the VOR radio receiver 172 is tuned to the desired VOR radio transmitter and the knob 76 is actuated to select the desired radial and its magnetic heading or indicator 88. Switch 165 will connect VOR radial converter 173 to bearing synchro 156 so that arrow indicator 111 will provide an indication of the bearing from the airplane to the selected VOR radio transmitter whose signals are being used.

Also brought into circuit is the radial circuit in VOR radio receiver 172 which feeds through leads 212 and 214 to switch 165. The deviation signals from the radial circuit are passed by leads 321 and 324 to switch 167 and therethrough to the rotor of actuator 125 which, as mentioned above, controls the lateral movement of radio beam indicator 119. The selected heading signals from heading selector 81 are connected continuously to heading signal responsive synchro 133 which controls the radio beam indicator 119 in its angular movements about disk 135 and compass rose 91. Switch 165 will also be positioned to connect the ambiguity circuit of VOR radio receiver 172, which provides signals by way of leads 207 and 209 to switch 165, into circuit with solenoid 333 in reversing switch 167 so that these signals may effect operation of switch 167 to cause a change in the polarity of signals to actuator 125 which deflects radio beam indicator 119 laterally, so that its sensing is changed, and to change the polarity of signals fed by heading selector synchro 81 to heading signal responsive synchro 133 which controls radio beam indicator 119 in its angular movements and is adapted to rotate this indicator end for end. Thus the signals from the ambiguity circuit cause the heading signals of heading selector synchro 81 to be so phased as to align the smaller end of radio beam indicator 119 with the angular position of the inbound heading on disk 135 and on the compass rose 91. Thus when the airplane is flying with selector knob 166 at VOR the beam indicator simulates the VOR selected radial and the face of the instrument becomes an operating diagram that continuously illustrates the airplane's attitude with respect to the earth by means of the artificial horizon lines 24a and the other horizontal lines on cylinder 23. It shows the airplane's attitude with respect to the air through which it is flying by means of marks 57 on the face of the angle of attack indicator 47 and by the position of the ball in ball skid indicator 169. It shows the airplane's magnetic heading at the vertical on compass rose 91. It shows the bearing and magnetic bearing to the VOR station by the angular position of bearing indicator 111 relative to the horizontal lines on the attitude indicator and to compass rose 91. It shows the distance to that station on the counter 151 which reacts to signals from synchro 144 and DME synchro 176. It shows the azimuth angle between the airplane and the selected radial. It shows the relative displacement between the airplane and the selected radial. It indicates the direction to the VOR transmitter on that radial. And it shows or indicates all of the airplane maneuvers that the pilot must effect to seek and to follow the selected radial asymptotically. The process may be said to be as easily accomplished as it would be to align the airplane with and to follow a highway or a railroad track.

Figure 10 will now be discussed. The numerals on the compass rose have been omitted to indicate that it is not necessary to read the compass rose in these maneuvers. Also the angle marks 100 were omitted to avoid unnecessary complications in the drawings. This figure provides a diagrammatic illustration of the changes in the dial of instrument 10 when an airplane flying on VOR approaches the VOR transmitter. At "a" the airplane is shown on its initial approach, here, the radio beam indicator 119 is across the top of the dial and shows that the selected radial is in front of the airplane and at right angles to the airplane's heading, and indicator 111 points to the VOR transmitter indicating that it is to the right. At "b" the pilot has rolled the airplane right by any desired roll (30 degrees shown) toward the smaller end of indicator 119 by rolling the 30° angle mark on the left side of the instrument casing (not shown) to the vertical on the attitude indicator. Illustrations "c" and "d" indicate that the airplane was held in that roll by maintaining the 30° angle mark at the vertical until the resulting turn of the airplane has caused the smaller end of indicator 119 to rotate to the top of the instrument dial, the roll angle was then regulated to maintain this smaller end of indicator 119 at the top of the instrument dial and the airplane rolls back to level flight on a heading that will intersect the beam at a 45° angle. This 45° angle setting is built into the instrument and determined by the amount of movement that actuator 125 can afford indicator 119. Illustration "e" shows the face of the dial as the airplane crosses the edge of the beam, at this point the radio beam indicator 119 starts to move toward the center of the instrument dial. Illustration "f" shows continued movement of indicator 119 toward the center of the dial. By rolling the airplane to maintain the smaller end of the indicator 119 at the top of the dial, as indicated at "g," "h," and "i" the airplane turns toward the beam heading and rolls back toward level flight as it approaches the center of the beam and finally arrives at the center of the beam in level flight and on the beams heading as shown at "j" and is flown on the centerline of the beam by rolling the airplane so as to maintain the smaller end of indicator 119 at the top of the instrument dial. It is noted that in all maneuvers of the airplane the bearing indicator 111 always pointed toward the VOR transmitter.

At "k" the airplane has passed over the VOR transmitter, the instrument now shows that indicator 119 has reversed its position to show that the transmitter is behind the airplane, and indicator 111 points directly at the VOR transmitter. To make a 180 degree turn and reapproach to the transmitter on the beam, the airplane is rolled right by any desired roll angle (assume 30 degrees) by rolling the 30° angle mark on the left side of the instrument casing to the vertical on the attitude indicator and maintaining it there until the resulting turn of the airplane has caused the indicator 119 to move to the left side of the instrument dial and the larger end of the indicator 119 brackets the 90 degree mark on the instrument casing on the left side of the instrument dial as the airplane leaves the beam. The roll is then regulated to continue this bracketing and the airplane rolls back to level flight and flies away from the beam at a 45 degree angle, as illustrated by "l," "m," "n" and "o." At the end of a safe timed interval the airplane is rolled left toward the larger end of the indicator 119 by a desired roll angle (assume 30 degrees) as indicated at "p." The 30° angle mark on the right side of the instrument casing is rolled to the vertical on the attitude indicator to attain and maintain this roll angle until the resulting turn has caused the indicator 119 to rotate around the outside of the instrument dial until the smaller end of the indicator 119 appears at the top of the instrument dial, as shown by "q," "r," "s" and "t." Maintaining it there rolls the plane back to level flight 45 degrees from the inbound beam heading. An asymptotic reapproach to the centerline of the beam at the end of the 180 degree turn is made, as in the initial approach, by rolling the airplane to maintain the smaller end of indicator 119 at the top of the instrument dial. This asymptotic reapproach is illustrated by "u," "v," "w," "x," "y" and "z."

When flying on a localizer the operating diagram appearing on the face of the instrument 10 will be slightly different. As stated hereinbefore, in such a flight the selector knob 166 of switch 165 will be positioned at LOC to connect the localizer circuit by means of leads 216 and 218 to switch 165. These deviation signals are channeled by leads 321 and 224 to switch 167 which sends them to the actuator 125 which deflects radio beam indicator 119 from its selected heading position. Heading selector knob 76 is rotated until synchros 81 and 133 align the smaller end of beam indicator 119 with the angular position of the inbound magnetic heading of the localizer beam on disk 135 and on compass rose 91 as shown on counter 88. VOR radio receiver 172 is then tuned to the localizer radio transmitter and radio beam indicator 119 then simulates the radio localizer beam. Tuning the ADF receiver 171 to the inner marker beacon causes bearing indicator 111 to show the flight bearing and magnetic bearing from the airplane to the beacon. As stated the operating diagram on the face of instrument 10 will be different when flying on LOC since there is no provision for phase reversal of the localizer signals when the airplane is flown over, or by, the localizer transmitter, radio beam indicator 119 continues to align its smaller end with the angular position of the inbound localizer beam magnetic heading regardless of the position of the airplane relative to the localizer transmitter, so that radio beam indicator 119 always indicates the direction in which the landing must be made. Since the error signals on the opposite sides of the localizer beam are the same on both sides of the localizer transmitter, the lateral deflection of the beam indicator is always toward the localizer beam regardless of the relative position and heading of the airplane with respect to the localizer beam. The flying technique to be employed is the same as that for flying a radial on a VOR except that location with respect to the airport or landing area is furnished by the numerical mileage counter 151, by bearing indicator 111, and indicator light 168, the latter being actuated by radio marker beacon receiver 175 in response to signals received from the radio marker beacons which are appropriately located along the localizer beam. Radio marker beacon receiver 175 is preferably used whenever VOR radio receiver 172 is operating, since there are many radio marker beacons located at strategic points along the airways.

When it is desired to fly a track toward, or away from any radio transmitter within the tuning range of the ADF receiver 171, that receiver is tuned to the radio transmitter frequency and the magnetic heading of the desired track is set into indicator 88 and selector knob 166 of switch 165 is turned to ADF. Switch 165 transmits the signals from ADF receiver 171 to bearing synchro 156 so that arrow indicator 111 points the direction to the selected radio transmitter. Switch 165 also transmits the signals from ADF receiver 171 to the stator 160 of track resolving synchro 159, and connects the track deviation signal received from coil 163 of rotor 162 of synchro 159 to switch 167 and therethrough to actuator 125 which deflects radio beam indicator 119, and further connects the signal from coil 164 into the circuit of ambiguity solenoid 333. The system then operates exactly as it does when flying on VOR and the flying technique is the same.

Figure 11 offers diagrammatic illustrations of the face of the instrument dial when it is desired to fly at a selected altitude. Illustration "a" shows the airplane in level flight and a selection of a higher altitude. Vertical guidance indicator 58 has risen to full scale deflection from its zero point at the artificial horizon. The nose of the airplane is raised until miniature airplane 18 is bracketed by indicator 58, as shown at "b," and the airplane starts to climb to the selected altitude. The angle of attack increases and the throttles are adjusted to maintain the airplane at the indicated climbing angle of attack as shown by angle of attack indicator 47. As the airplane approaches the selected altitude, illustration "c," the indicator 58 and artificial horizon 24a approach alignment. By maintaining the miniature airplane 18 bracketed by indicator 58, the airplane approaches level flight, illustration "d," and the selected altitude simultaneously and finally flies level, illustration "e," at the new selected altitude.

The vertical speed of an aircraft is usually proportional to its pitch angle from the horizontal. By using pitch signals to indicate the aircraft's pitch angle and by indicating the aircraft's deviation from a selected vertical guidance parameter around the same axis, the pitch angle may be made proportional to the indicated vertical guidance deviation to produce an asymptotic approach to the selected vertical guidance parameter.

If the airplane should be in level flight and a lower altitude is selected, the vertical guidance indicator 58, would fall, illustration "f," to full scale deflection from its zero point. The nose of the airplane is lowered until the miniature airplane is bracketed by indicator 58, illustration "g," and the airplane starts to descend to the selected altitude. On approach to the selected altitude, the indicator 58 and artificial horizon 24a approach alignment, illustration "h." By maintaining the miniature airplane 18 centered in indicator 58 the actual airplane approaches level flight, illustration "i," and the new selected altitude simultaneously and finally flies level at that altitude, illustration "j."

Figure 12 is an illustration of the flying of a glide path. In illustration "a" the airplane is approaching the glide path in level flight on the localizer beam with the throttles adjusted to maintain the indicated angle of attack for such an approach. Vertical guidance indicator 58 has maximum deflection upward from the artificial horizon 24a to show that the glide path is above the airplane. The indicator 58 starts downward, illustration "b," as the airplane crosses the lower edge of the glide path. Level flight is continued until indicator 58 brackets the miniature airplane 18, illustration "d," as the centerline of the glide path is reached. The miniature airplane 18 is then maintained centered on the indicator 58 which noses the airplane down sufficiently to follow the glide path, illustration "e." The throttles are adjusted to maintain the angle of attack indicated for an approach. The airplane is flown down the glide path slightly above its centerline by bracketing the miniature airplane 18 with the indicator 58 and adjusting the throttles to maintain the angle of attack indicated for such an approach.

In illustration "f" the airplane is flying above the glide path in level flight on the localizer beam with the throttles adjusted to maintain the indicated angle of attack for an approach. Indicator 58 has maximum deflection downward from the artificial horizon 24a indicating that the glide path is below the airplane. The airplane is nosed down to center the miniature airplane 18 within indicator 58, illustration "g" and dives toward the glide path with its throttle adjusted to maintain the approach angle of attack. Indicator 58 starts to rise toward the artificial horizon, illustration "h," as the airplane crosses the upper edge of the glide path and the nose of the airplane is raised to maintain the miniature airplane 18 centered in the indicator 58. By maintaining it there, illustration "i," the airplane approaches the glide path asymptotically and flies down it slightly above its centerline, illustration "j," in the meantime the throttles are adjusted to maintain the angle of attack indicated for an approach so that the airplane is ready to land when it reaches the runway.

With the present instrument the operations of the airplane from take-off, to a selected altitude, along the selected track, and to let down are all indicated. The pilot merely has to set his approved flight plan into the instrument and the instrument directs the maneuvers to be taken to take the airplane to its objective. At the airport, he selects the magnetic heading of the runway on which the take-off is to be made. He selects the altitude to which the airplane must rise before turning. When the airplane reaches that height he then sets in the next flight plan dictated by his approved flight chart. In this operation he sets in the heading of the selected VOR radial and sets the knob 166 to VOR. He then operates the altitude selector to the flight plan assigned altitude. The airplane is then flown along the desired track. When his objective is reached, he approaches the VOR station and flies the plane down, as described in connection with Figures 10 and 12.

While an instrument illustrating the principles of the invention has been specifically disclosed, it is understood that the invention is not limited thereto as many variations will be readily apparent to those skilled in the art and the invention is to be given its broadest possible interpretation within the terms of the following claims.

I claim:

1. In an aircraft flight and guidance instrument the combination comprising a casing having a window, an angle of attack indicator visible in the window and having thereon graduation marks normal to its length, said indicator being elongated vertically and arranged for movement in the direction of its longitudinal axis, means to stabilize said elongated indicator with roll signals so that said graduation marks of said elongated indicator are maintained in a horizontal position, means to operate said elongated indicator in response to angle of attack signals from measuring means and reading reference means at the center of the window.

2. In an aircraft flight and guidance instrument the combination comprising an attitude indicator having thereon a reference line that is rotated about a roll axis normal to its length and parallel with the aircraft's roll axis by means responsive to roll signals and that is rotated about a pitch axis that is normal to its roll axis by means responsive to pitch signals, a vertical guidance indicator that is rotated about the pitch axis of the attitude indicator by means responsive to signals from vertical guidance sources in accordance with the deviation of the aircraft from selected vertical guidance parameters and reading reference means centered at the roll axis of the attitude indicator.

3. In an aircraft instrument the combination as in claim 2 and in which the said vertical guidance indicator is elongated and the length thereof is maintained parallel with the pitch axis of the said reference line.

4. In an aircraft flight and guidance instrument, the combination comprising an attitude indicator having thereon a horizontal reference line that is rotated about a roll axis normal to its length and parallel with the aircraft's roll axis to indicate the horizontal by means responsive to roll signals and that is rotated about a pitch axis normal to its roll axis by means responsive to pitch signals, a vertical guidance indicator that is rotated about the pitch axis of the attitude indicator, with respect to the said horizon reference line, by means responsive to signals from vertical guidance sources in accordance with the deviation of the aircraft from selected vertical guidance parameters and reading reference means fixed to the aircraft and centered at the roll axis of the attitude indicator.

5. In an aircraft flight and guidance instrument, the combination as in claim 2 wherein the vertical guidance source selected comprises means to derive from altitude signals, signals responsive to the deviation of the aircraft from any selected altitude to rotate the vertical guidance indicator about its pitch axis in accordance with deviation of the aircraft from the selected altitude, and means to indicate the selected altitude.

6. In an aircraft flight and guidance instrument, the combination as in claim 2 wherein the vertical guidance source selected comprises signals responsive to the vertical deviation of the aircraft from a path defined by signals radiated by a remote radiant energy source to rotate the vertical guidance indicator about its pitch axis in accordance with vertical deviation of the aircraft from that path.

7. In an aircraft flight and guidance instrument, the combination as in claim 2 wherein the vertical guidance source also includes signals responsive to the deviation of the dynamic force, acting on the aircraft parallel to its yaw axis, from a selected force range to rotate the vertical guidance indicator about its pitch axis in accordance with the said deviation.

8. In an aircraft flight and guidance instrument, the combination as in claim 2 wherein the vertical guidance source also includes signals responsive to the deviation of the aerodynamic force acting on the aircraft from a selected force range to rotate the vertical guidance indicator about its pitch axis in accordance with the said deviation.

9. In an aircraft flight and guidance instrument, the combination as in claim 2 wherein the vertical guidance source also includes signals responsive to the deviation of the aircraft's angle of attack from a selected angle of attack range to rotate the vertical guidance indicator about its pitch axis in accordance with deviation of the aircraft's angle of attack from the selected range.

10. In an aircraft flight and guidance instrument the combination comprising a compass rose arranged to rotate about an axis parallel with the aircraft's roll axis in response to compass signals, a reading reference means centered at the axis of the compass rose and means, responsive to roll signals, to vary the angle between North on the compass rose and the said reading reference means to indicate an apparent heading for the aircraft on the compass rose that varies with the aircraft's roll angle.

11. In an aircraft flight and guidance instrument the combination comprising a compass rose arranged to rotate about an axis parallel with the aircraft's roll axis in response to compass signals, means to stabilize the compass rose with roll signals so that the compass rose rotates with respect to the horizontal only in response to compass signals and means to indicate an apparent heading for the aircraft on the compass rose that varies with the roll angle of the aircraft.

12. In an aircraft flight and guidance instrument the combination comprising a casing having a window mounted perpendicular to the aircraft's roll axis, a compass rose visible in the window and arranged to rotate in a plane parallel with the window in response to compass signals, means to stabilize the compass rose with roll signals so that the compass rose rotates with respect to the horizontal only in reponse to compass signals, a reading reference mark on the casing at the top of the window and a ball skid indicator centered above the said reference mark on the casing.

13. In an aircraft flight and guidance instrument the combination comprising an attitude indicator having thereon a horizon reference line that is rotated about a roll axis normal to its length and parallel with the aircraft's roll axis to indicate the horizontal by means controlled by roll signals and that is rotated about a pitch axis normal to its roll axis by means controlled by pitch signals, a compass rose arranged to rotate about the roll axis of the attitude indicator in response to compass signals, means to stabilize the compass rose with roll signals so that the compass rose rotates with respect to the horizontal indicated by the attitude indicator only in response to compass signals and reading reference means fixed to the aircraft and located at the center and periphery of the compass rose.

14. In an aircraft flight and guidance insrtument the combination comprising a radio beam indicator arranged to rotate about an axis parallel with the aircraft's roll axis in response to compass signals, means to position the radio beam indicator angularly at a selected heading position including means to indicate the selected heading, a reading reference means centered at the axis of the radio beam indicator and means, responsive to roll signals to vary the angle between the radio beam indicator and the reading reference means to indicate any apparent deviation of the aircraft from the selected heading as an angle that varies with the aircraft's roll angle.

15. In an aircraft flight and guidance instrument the combination comprising a radio beam indicator arranged to rotate about an axis parallel to the aircraft's roll axis in response to compass signals, means to stabilize said radio beam indicator with roll signals so that said radio beam indicator rotates with respect to the horizontal only in response to said compass signals, and means to position said radio beam indicator angularly at any selected heading position including means to indicate the selected heading.

16. In an aircraft flight and guidance instrument the combination comprising a casing having an instrument face mounted perpendicular to the aircraft's roll axis, a radio beam indicator arranged to rotate around said face in response to compass signals, means to stabilize said radio beam indicator with roll signals so that said radio beam indicator rotates with respect to the horizontal only in response to said compass signals, and means to position said radio beam indicator angularly at any selected heading position including means to indicate the selected heading separately on the instrument.

17. In an aircraft flight and guidance instrument the combination comprising a radio beam indicator arranged to rotate about an axis parallel with the aircraft roll axis in response to compass signals, means to stabilize the radio beam indicator with roll signals so that the radio beam indicator rotates with respect to the horizontal only in response to the compass signals, means to position the radio beam indicator angularly at any selected heading position including means to indicate the selected heading and means to indicate any apparent deviation of the aircraft from the selected heading as an angle that varies with the roll angle of the aircraft.

18. In an aircraft flight and guidance instrument the combination as in claim 14 and means responsive to deviation signals from a selected source of azimuth guidance, to deflect the radio beam indicator from the selected heading position when the airplane deviates from a selected azimuth guidance parameter.

19. In an aircraft flight and guidance instrument the combination as in claim 18 wherein the azimuth guidance source selected comprises means to derive from compass signals, signals responsive to the deviation of the aircraft from a selected heading to deflect the radio beam indicator from the selected heading position to magnify the heading error when the aircraft deviates from the selected heading.

20. In an aircraft flight and guidance instrument the combination as in claim 18 wherein the radio beam indicator is elongated for track representation and the selected source of azimuth guidance comprises signals responsive to the deviation of the aircraft from a track through the signal source on the selected heading to deflect the radio beam indicator from its selected heading position toward that track when the airplane deviates from the track.

21. In aircraft flight and guidance instrument the combination as in claim 20 wherein the source of azimuth guidance selected comprises means to derive from signals representing the bearing from the aircraft to an azimuth guidance source, signals responsive to the deviation of the aircraft from a track through the signal source on the selected heading, to deflect the radio beam indicator from its selected heading position toward the selected track when the aircraft deviates from that track.

22. In an aircraft flight and guidance instrument the combination as in claim 20 wherein the azimuth guidance source selected comprises track deviation signals, derived from azimuth signals radiated by a radiant energy source, to deflect the radio beam indicator from its selected heading position toward the selected track when the aircraft deviates from a track through the said signal source on the selected heading.

23. In an aircraft flight and guidance instrument the combination as in claim 21 wherein the bearing signals are derived from non-directional signals radiated by the selected signal source to deflect the radio beam indicator from its selected heading position toward the selected track when the aircraft deviates from a track through the signal source on the selected heading.

24. In an aircraft flight and guidance instrument the combination as in claim 20 wherein the radio beam indicator has a unidirectional shape to indicate the direction to the signal source and means responsive to reversing signals derived from signals radiated by the said signal source, for reversing the direction of the radio beam indicator in its selected heading position and for simultaneously reversing the sensing of its displacement from its center of rotation, when the aircraft passes the selected signal source on the selected track.

25. In an aircraft flight and guidance instrument the combination as in claim 24 wherein the reversing signals are derived from signals responsive to the bearing from the airplane to the selected signal source to reverse the direction of the radio beam indicator in its selected heading position and to simultaneously reverse the sensing of its displacement from its center of rotation when the aircraft passes the said signal source.

26. In an aircraft flight and guidance instrument the combination as in claim 24 wherein the reversing signals are derived from azimuth signals radiated by the selected signal source to reverse the direction of the radio beam indicator in its selected heading position and to simultaneously reverse the sensing of its displacement from its center of rotation when the aircraft passes the selected signal source.

27. In an aircraft flight and guidance instrument, the combination comprising a compass rose arranged to rotate about an axis parallel with the aircraft's roll axis in response to compass signals, a radio beam indicator arranged to rotate about the axis of the compass rose also in response to compass signals, means to position the radio beam indicator angularly at a selected heading on the compass rose and means to stabilize the compass rose and the radio beam indicator with roll signals so that the two indicators rotate in unison with respect to the horizontal only in response to compass signals.

28. In a system for craft navigation, means for guiding the craft along a track on any selected compass heading through any signal source selected for azimuth guidance by measuring and indicating the azimuth angle between the selected compass heading and the bearing from the craft to the selected signal source that is formed when the craft deviates from the track on the selected compass heading through the selected signal source, comprising a first synchro means responsive to compass signals, a second synchro means having its stator responsive to signals representing the bearing from the craft to the selected signal source, means to align the rotor of the second synchro means with the selected compass heading in the first synchro, including means to indicate the selected compass heading, whereby signals are produced in the rotor of the second synchro proportional to the said azimuth angle between the selected compass heading and the bearing from the craft to the selected signal source, and a second indicating means activated by said azimuth angle signals for indicating the sense and amplitude of the craft's deviation from that track.

29. In a system for craft navigation, the combination as in claim 28 wherein the second indicator means is arranged to rotate about an axis and means to rotate the second indicator means about said axis in response to compass signals and to align the second indicator with the selected compass heading to indicate the sense and amplitude of the craft's deviation from the selected track as a displacement from the angular position of the selected heading.

30. In a system for craft navigation, the combination as in claim 29, a compass rose arranged to rotate about the axis of the second indicator and means to rotate the compass rose about said axis also in response to the compass signals, for indicating the sense and amplitude of the craft's deviation from the selected track as a displacement from the selected heading on said compass rose.

31. In an aircraft flight and guidance instrument, the combination comprising a radio beam indicator arranged to rotate about an axis parallel to the aircraft's roll axis in response to compass signals, means responsive to the positioning of a manually operable member to position said radio beam indicator angularly at any selected heading position including means to indicate the selected heading, means also responsive to the simultaneous positioning of said member for selecting a radial on the selected heading to a source of azimuth signals and means for deriving, according to the selected radial, from the signals received from said source, signals representing deviation of the aircraft from said radial, said derived signals in turn deflecting said radio beam indicator to indicate said deviation.

32. In an aircraft flight and guidance instrument, the combination as specified in claim 31 wherein means energized by compass signals is also responsive to the positioning of said manually operable member for deriving from compass signals, signals responsive to the deviation of the aircraft from the selected heading for alternative use in deflecting said radio beam indicator to magnify deviation from the selected compass heading.

33. In an aircraft flight and guidance instrument, the combination comprising a casing having a window mounted perpendicular to the aircraft's roll axis, an elongated radio beam indicator arranged to rotate around the window in response to compass signals, means to position the radio beam indicator angularly at a selected heading position including means to indicate the selected heading, means responsive to signals that represent the deviation of the aircraft from a track on the selected heading to displace the radio beam indicator laterally from its center of rotation in accordance with deviation of the aircraft from the track, a numerical distance indicator visible in the window, means to operate the distance indicator in response to signals representing the distance from the aircraft to a signal point on the said track, and means to stabilize the distance indicator and the radio beam indicator with roll signals so that the numerals on the distance indicator are maintained in a vertical position and the radio beam indicator rotates with respect to the horizontal only in response to compass signals and aligns with the vertical shown by the numerals on the distance indicator when the aircraft is flying on the selected heading.

34. In an aircraft flight and guidance instrument, the combination comprising a casing having a window mounted perpendicular to the aircraft's roll axis, an elongated radio beam indicator arranged to rotate around the window in response to compass signals, means to stabilize the radio beam indicator with roll signals so that it rotates with respect to the horizontal only in response to compass signals, means to position the radio beam indicator angularly at a selected heading position including means to indicate the selected heading, means responsive to signals that represent the sense and amplitude of the deviation of the aircraft from a track on the selected heading to displace the radio beam indicator laterally from its center of rotation in accordance with deviation of the aircraft from the said track, a reading reference mark on the casing at the top of the window, a position indicating light centered above the reference mark on the casing and means, responsive to signals received from radiant energy sources spaced along the said track, to activate the light when the aircraft flies over each signal source on the said track.

35. In an aircraft flight and guidance instrument, the combination comprising a casing having a window mounted perpendicular to the aircraft's roll axis, a radio beam indicator arranged to rotate around the window in response to compass signals, means to position the radio beam indicator angularly at a selected heading position including means to indicate the selected heading, means to stabilize the radio beam indicator with roll signals so that it rotates with respect to the horizontal only in response to compass signals, a reading reference mark on the casing at the top of the window and a ball skid indicator centered above the said reference mark on the casing.

36. In an aircraft flight and guidance instrument, the combination comprising an attitude indicator having thereon a horizon reference line that is rotated about a roll axis normal to its length and parallel with the aircraft's roll axis by means responsive to roll signals, to indicate the horizontal, and that is rotated about a pitch axis that is normal to its roll axis by means responsive to pitch signals, a radio beam indicator arranged to rotate about the roll axis of the attitude indicator in response to compass signals, means to position the radio beam indicator angularly at a selected heading position including means to indicate the selected heading, and means to stabilize the radio beam indicator with roll signals so that it rotates with respect to the horizontal indicated by horizon reference line on the attitude indicator only in response to the compass signals.

37. In an aircraft flight and guidance instrument, the combination comprising an attitude indicator having thereon a horizon reference line which is rotated about a roll axis normal to its length and parallel with the aircraft's roll axis by means responsive to roll signals, to indicate the horizontal, and that is rotated about a pitch axis that is normal to its roll axis by means responsive to pitch signals, a compass rose arranged to rotate about the roll axis of the attitude indicator in response to compass signals, a radio beam indicator also arranged to rotate about the roll axis of the attitude indicator, in response to compass signals, means to position the radio beam indicator at a selected heading on the compass rose and means to stabilize the compass rose and the radio beam indicator with roll signals so that the two indicators rotate in unison only with respect to the horizontal indicated by aforesaid horizon reference line in response to compass signals.

38. In an aircraft flight and guidance instrument the combination comprising a bearing indicator arranged to rotate about an axis parallel with the aircraft's roll axis in response to bearing signals from a selected azimuth guidance source, a reading reference means centered at the axis of the bearing indicator and means, responsive to roll signals, to vary the angle between the bearing indicator and the said reading reference to indicate an apparent bearing angle from the aircraft to the signal source that varies with the aircraft's roll angle.

39. In an aircraft flight and guidance instrument the combination comprising a bearing indicator arranged to rotate about an axis parallel with the aircraft roll axis in response to bearing signals from an azimuth guidance source, means to stabilize the bearing indicator with roll signals so that the bearing indicator rotates with respect to the horizontal only in response to said bearing signals, and means to indicate an apparent bearing angle for the indicator that varies with the roll angle of the aircraft.

40. In an aircraft flight and guidance instrument the combination comprising a casing having an instrument face mounted perpendicular to the aircraft's roll axis, an azimuth information indicator arranged to rotate around said face in response to bearing signals from azimuth guidance means, and means to stabilize said indicator with roll signals so that said indicator rotates with respect to the horizontal only in response to said bearing signals.

41. In an aircraft flight and guidance instrument, the combination as in claim 38 wherein the bearing signals are derived from non-directional signals radiated by the selected signal source and the bearing indicator is aligned thereby in the direction to said source.

42. In an aircraft flight and guidance instrument, the combination as in claim 38 wherein the bearing signals are derived from azimuth signals radiated by the selected signal source and the bearing indicator is aligned thereby in the direction to said source.

43. In an aircraft flight and guidance instrument, the combination comprising a casing having a window mounted perpendicular to the aircraft's roll axis, a bearing indicator arranged to rotate around the window in response to bearing signals from an azimuth guidance source, means to stabilize the bearing indicator with roll signals so that it rotates with respect to the horizontal only in response to the bearing signals, a reading reference mark on the casing at the top of the window and a ball skid indicator centered above the said reference mark on the casing.

44. In an aircraft flight and guidance instrument the combination comprising an attitude indicator having thereon a horizon reference line that is rotated about a roll axis normal to its length and parallel with the aircraft's roll axis to indicate the horizontal by means controlled by roll signals and that is rotated about a pitch axis normal to its roll axis by means controlled by pitch signals, a bearing indicator arranged to rotate about the roll axis of the attitude indicator in response to bearing signals from an azimuth guidance source, means to stabilize the bearing indicator with roll signals so that the bearing indicator rotates with respect to the horizontal indicated by the attitude indicator only in response to bearing signals and reading reference means fixed to the aircraft and located at the center and periphery of the circle described by the bearing indicator.

45. In a flight and guidance instrument for aircraft the combination comprising, a compass rose arranged to rotate about an axis parallel with the aircraft's roll axis in response to compass signals, a bearing indicator arranged to rotate about the axis of the compass rose in response to bearing signals from an azimuth guidance source, means to stabilize the compass rose and said bearing indicator with roll signals so that each one rotates with respect to the horizontal only in response to its respective control signals and reading reference means fixed to the aircraft and located with reference to the center and periphery respectively of the compass rose.

46. In an aircraft flight and guidance instrument, the combination comprising a radio beam indicator arranged to rotate about an axis parallel with the aircraft's roll axis in response to compass signals, means to position the radio beam indicator angularly at a selected heading position including means to indicate the selected heading, means to stabilize the radio beam indicator with roll signals so that it rotates with respect to the horizontal only in response to compass signals, and a bearing indicator arranged to rotate about the axis of the radio beam indicator in response to bearing signals from an azimuth guidance source, said bearing indicator also being stabilized with roll signals so that it rotates with respect to the radio beam indicator only in response to bearing signals.

47. In an aircraft flight and guidance instrument the combination comprising an attitude indicator having thereon a horizon reference line that is rotated about a roll axis that is normal to its length and parallel with the aircraft's roll axis to indicate the horizontal by means controlled by roll signals and that is rotated about a pitch axis normal to its roll axis by means controlled by pitch signals, a compass rose arranged to rotate about the roll axis of the attitude indicator in response to compass signals, a bearing indicator arranged to rotate about the roll axis of the attitude indicator in response to bearing signals from an azimuth guidance source, means to stabilized the compass rose and the bearing indicator with roll signals so that each indicator rotates with respect to the horizontal indicated by the attitude indicator only in response to its respective control signals and reading reference means fixed to the aircraft and located at the center and periphery of the compass rose.

48. An aircraft flight and guidance instrument comprising in combination, an attitude indicator for indicating pitch and roll attitudes of the aircraft, said indicator being rotatable in response to roll signals about an axis parallel to the roll axis of the aircraft for representing roll attitude, a compass rose mounted in concentric relation to said axis and likewise stabilized in roll so that its motion with respect to the horizontal is only in response to compass signals, a bearing indicator also mounted in concentric relation to said axis, and likewise stabilized in roll so that its motion with respect to the horizontal is only in response to bearing signals from an azimuth guidance source, a radio beam indicator mounted for combined rotational and transverse movement with respect to said axis for indicating respectively a selected heading and the deviation from that heading, said radio beam indicator likewise being stabilized in roll so that its motion with respect to the horizontal is only in response to said compass signals, and means to position said radio beam indicator angularly with respect to said axis at a selected heading, said attitude indicator, compass rose, bearing indicator and radio beam indicator being arranged in superposed relation about said axis to form an integrated instrument face.

49. An aircraft flight and guidance instrument as specified in claim 48 wherein a shaft in alignment with the aforesaid axis is rotatable in accordance with roll signals to transmit roll stabilization movement to all said indicators.

50. An aircraft flight and guidance instrument as specified in claim 48 wherein a plurality of synchros are aligned on the said axis for adding algebraically signals representing the bearing from the aircraft to a signal source, compass signals and selected heading signals to produce resultant signals for positioning the radio beam indicator to represent deviation from a track on the selected heading through the said signal source.

51. In an aircraft flight and guidance instrument the combination comprising a radio beam indicator that is moved about an axis parallel with the aircraft's roll axis by means responsive to selected compass heading signals and to signals from a selected azimuth guidance source to indicate the deviation of the aircraft from a selected azimuth guidance parameter and its compass heading, a reading reference means centered at the axis of the radio beam indicator and means, responsive to roll signals, to vary the angle between the radio beam indicator and the said reading reference means to indicate the deviation of the aircraft from the selected azimuth guidance parameter and its compass heading as an angle that varies with the aircraft's roll angle.

52. In an aircraft flight and guidance instrument the combination comprising an elongated radio beam indicator that is rotated about an axis normal to its length and parallel with the aircraft's roll axis by means responsive to compass signals, means to position the radio beam indicator angularly at a selected compass heading position, including means to indicate the selected compass heading, means responsive to track deviation signals derived from signals radiated by a signal source selected for azimuth guidance, to displace the radio beam indicator laterally from its center of rotation in accordance with the deviation of the aircraft from a track on the selected heading through the selected signal source, means to indicate the direction of the signal source on the selected track, including means responsive to reversing signals derived from signals radiated by the selected signal source, to reverse the direction indication when the aircraft passes the selected signal source on the selected track and reading reference means centered at the rotational axis of the radio beam indicator.

53. In an aircraft flight and guidance instrument the combination comprising a compass rose that is rotated about an axis parallel with the aircraft's roll axis by means responsive to compass signals, an elongated radio beam indicator that is rotated about the axis of the compass rose by means also responsive to compass signals, means to align the radio beam indicator with a selected heading and its reciprocal on the compass rose, means responsive to track deviation signals derived from signals radiated by a signal source selected for azimuth guidance, to displace the radio beam indicator laterally from the selected heading on the compass rose to a compass heading toward the selected track when the aircraft deviates from a track on the selected heading through the selected signal source, means to indicate the compass heading to the selected signal source on the selected track including means, responsive to reversing signals derived from signals radiated by the selected signal source, to reverse the compass heading indication when the aircraft passes the selected signal source on the selected track and reading reference means centered at the axis of the compass rose.

References Cited in the file of this patent

UNITED STATES PATENTS

| | | |
|---|---|---|
| Re. 22,704 | Moseley | Dec. 25, 1945 |
| 2,171,293 | Plastino | Aug. 29, 1939 |
| 2,302,282 | Weibull | Nov. 17, 1942 |
| 2,322,225 | Crane et al. | June 22, 1943 |
| 2,400,232 | Hall | May 14, 1946 |
| 2,424,570 | Jenks | July 29, 1947 |
| 2,463,529 | Ferrill | Mar. 8, 1949 |
| 2,465,411 | Williams | Mar. 29, 1949 |
| 2,548,278 | Wirkler | Apr. 10, 1951 |
| 2,582,588 | Fennessy et al. | Jan. 15, 1952 |